United States Patent
Matsuda et al.

(10) Patent No.: US 11,593,146 B2
(45) Date of Patent: Feb. 28, 2023

(54) MANAGEMENT DEVICE, INFORMATION PROCESSING SYSTEM, AND NON-TRANSITORY COMPUTER-READABLE STORAGE MEDIUM FOR STORING MANAGEMENT PROGRAM

(71) Applicant: FUJITSU LIMITED, Kawasaki (JP)

(72) Inventors: Junichi Matsuda, Kawasaki (JP); Keiji Miyauchi, Yokohama (JP); Akihiro Doshita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 108 days.

(21) Appl. No.: 17/158,046

(22) Filed: Jan. 26, 2021

(65) Prior Publication Data
US 2021/0286641 A1    Sep. 16, 2021

(30) Foreign Application Priority Data

Mar. 13, 2020    (JP) .............................. JP2020-044809

(51) Int. Cl.
| | | |
|---|---|---|
| *G06F 15/173* | (2006.01) | |
| *G06F 9/455* | (2018.01) | |
| *H04L 67/1097* | (2022.01) | |
| *H04L 43/0888* | (2022.01) | |

(52) U.S. Cl.
CPC ...... *G06F 9/45558* (2013.01); *H04L 43/0888* (2013.01); *H04L 67/1097* (2013.01); *G06F 2009/4557* (2013.01)

(58) Field of Classification Search
CPC ......... G06F 2009/4557; G06F 9/45558; H04L 43/0888; H04L 67/1097

USPC ........................................ 709/223, 226, 229
See application file for complete search history.

(56) References Cited

U.S. PATENT DOCUMENTS

| | | | |
|---|---|---|---|
| 2008/0183774 | A1 | 7/2008 | Otani et al. |
| 2014/0359058 | A1* | 12/2014 | Karnawat ............. G06F 3/0647 709/217 |
| 2014/0380014 | A1* | 12/2014 | Moyer .................. G06F 3/0632 711/170 |

(Continued)

FOREIGN PATENT DOCUMENTS

| | | | | |
|---|---|---|---|---|
| CN | 104008017 A | * | 8/2014 | ............. G06F 3/061 |
| CN | 105117325 A | * | 12/2015 | |
| CN | 112882917 A | * | 6/2021 | |

(Continued)

*Primary Examiner* — Liang Che A Wang
(74) *Attorney, Agent, or Firm* — Fujitsu Patent Center

(57) ABSTRACT

A management device of managing an information processing system includes: a memory; and a processor coupled to the memory, the processor being configured to perform processing, the processing including: determining a Quality of Service (QoS) value of a migration destination volume by using a first throughput and a second throughput, the first throughput being a throughput regarding an access to a migration source storage device of a migration source physical server, the second throughput being a throughput regarding an access to a migration destination storage device of a migration destination physical server; and generating a first command to issue the generated first command to the migration destination storage device, the first command being a command to create the migration destination volume by using the determined QoS value.

9 Claims, 29 Drawing Sheets

(56) References Cited

U.S. PATENT DOCUMENTS

2022/0179585 A1\* 6/2022 Muthiah ............... G06F 3/0625

FOREIGN PATENT DOCUMENTS

| JP | 2008-181461 A | 8/2008 |
| JP | 2014-153997 A | 8/2014 |

\* cited by examiner

FIG. 2

| VIRTUAL SERVER NAME | DEPLOY DESTINATION PHYSICAL SERVER NAME | PHYSICAL VOLUME NAME | VOLUME SIZE |
|---|---|---|---|
| VM1 | Server1 | Volume1 | 1000GB |
| VM1 | Server1 | Volume2 | 10GB |
| VM1 | Server1 | Volume3 | 200GB |
| VM2 | Server2 | Volume1 | 500GB |
| VM2 | Server2 | Volume2 | 600GB |
| ... | ... | ... | ... |

FIG. 3

| STORAGE DEVICE NAME | ACCESS DESTINATION PHYSICAL SERVER NAME | PHYSICAL VOLUME NAME |
|---|---|---|
| Storage1 | Server1 | Volume1 |
| Storage1 | Server1 | Volume2 |
| Storage1 | Server1 | Volume3 |
| Storage2 | Server2 | Volume1 |
| Storage2 | Server2 | Volume2 |
| Storage2 | Server2 | Volume3 |
| ... | ... | ... |

FIG. 4

| VIRTUAL SERVER NAME | PHYSICAL SERVER NAME | PHYSICAL VOLUME NAME | IOPS | STORAGE DEVICE NAME | COLLECTION TIME |
|---|---|---|---|---|---|
| VM1 | Server1 | Volume1 | 100 | Storage1 | 2019-11-11 10:00:00 |
| VM1 | Server1 | Volume2 | 10 | Storage1 | 2019-11-11 10:00:00 |
| VM2 | Server2 | Volume1 | 50 | Storage2 | 2019-11-11 10:00:00 |
| VM3 | Server3 | Volume1 | 100 | Storage3 | 2019-11-11 10:00:00 |
| VM1 | Server1 | Volume1 | 10 | Storage1 | 2019-11-11 10:10:00 |
| VM1 | Server1 | Volume2 | 50 | Storage2 | 2019-11-11 10:10:00 |
| VM2 | Server2 | Volume1 | 100 | Storage2 | 2019-11-11 10:10:00 |
| VM3 | Server3 | Volume1 | 100 | Storage3 | 2019-11-11 10:10:00 |
| ... | ... | ... | ... | ... | ... |

FIG. 5

| IOPS | VOLUME QoS | BANDWIDTH |
|---|---|---|
| 100 | 3 | 100 |
| 200 | 5 | 300 |
| 500 | 7 | 500 |
| 700 | 9 | 1000 |
| ... | ... | ... |

FIG. 6

| STORAGE DEVICE NAME | MAXIMUM IOPS |
|---|---|
| Storage1 | 300000 |
| Storage2 | 300000 |
| Storage3 | 300000 |
| Storage4 | 300000 |
| ... | ... |

# MANAGEMENT DEVICE, INFORMATION PROCESSING SYSTEM, AND NON-TRANSITORY COMPUTER-READABLE STORAGE MEDIUM FOR STORING MANAGEMENT PROGRAM

CROSS-REFERENCE TO RELATED APPLICATION

This application is based upon and claims the benefit of priority of the prior Japanese Patent Application No. 2020-44809, filed on Mar. 13, 2020, the entire contents of which are incorporated herein by reference.

FIELD

The embodiment discussed herein is related to a management device, an information processing system, and a non-transitory computer-readable storage medium storing a management program.

BACKGROUND

A general cloud service virtualizes physical resources such as a server, a network, or a storage device by a virtualization function and provides the virtualized physical resources. When providing a volume to a virtual server, the general cloud service provides a virtual volume to the virtual server.

On the other hand, unlike the general cloud service, there is a cloud service that provides a virtual system suitable for applications such as a core system. Such a cloud service provides virtual resources in a form close to occupation of the physical resources. Here, such a cloud service will be discussed. For example, a target cloud service provides a virtual system by a physical volume including a storage device, individual resources of a physical server, or the like. When the physical volume is configured, by setting a definition of connection between the virtual server and the physical volume, connection to the physical volume is isolated between the virtual servers.

FIGS. 28A and 28B are diagrams for explaining a difference between a general cloud platform and a target cloud platform. FIG. 28A illustrates an example of the general cloud platform, and FIG. 28B illustrates an example of the target cloud platform. As illustrated in FIG. 28A, the general cloud platform includes islands represented by an island #1, an island #2, . . . , and an island #X (X is positive number).

Each island includes a physical server 94 each represented as a physical server #1, a physical server #2, . . . , and a physical server #X and a storage device 96 each represented as a storage device #1, a storage device #2, . . . , a storage device #X. Each physical server 94 is connected by a switch 98. A virtual server (VM) 4a operates in each physical server 94. Each storage device 96 includes a physical volume 6b each represented as a Vol #1, a Vol #2, . . . , and a Vol #Y (Y is positive number).

On the other hand, as illustrated in FIG. 28B, the target cloud platform includes the islands represented by the island #1, the island #2, . . . , and the island #X (X is positive number). However, each island includes a switch 93 instead of the switch 98.

In a general cloud platform, the VM 4a can access the physical volume 6b of another storage device 96. For example, as illustrated in FIG. 28A, the VM 4a of the island #1 can access the physical volume 6b of the island #2. On the other hand, in the target cloud platform, it is not possible for the VM 4a to access the physical volume 6b of the other storage device 96. For example, as illustrated in FIG. 28B, it is not possible for the VM 4a of the island #1 to access the physical volume 6b of the island #2. In this way, the target cloud platform improves security by performing access control on the VM 4a and the physical volume 6b.

Note that, as a typical technique regarding data migration between storage devices, there is a control device that does not need compatibility between a migration source NAS device and a migration destination NAS device and inexpensively and safely realizes data migration between the NAS devices. This control device copies all data in a migration source directory of the migration source NAS device to a migration destination directory of the migration destination NAS device. While the data is copied, the migration source NAS device accepts addition/update of data to the migration source directory. After the copy is completed, the control device copies data corresponding to a difference caused in the migration source directory (difference copy) and continues the difference copy until a time needed for copy falls below a determined time. This control device stops an access from a client by the migration source NAS device, copies the final difference data to the migration destination NAS device, and starts to receive the access from the client by the migration destination NAS device.

Furthermore, as a typical technique regarding live migration of virtual machines, there is a management device that can secure a sufficient bandwidth needed for memory copy and does not excessively restrict competing user traffic when live migration of the plurality of virtual machines is performed. This management device determines an execution order of the live migration of the plurality of virtual machines on the basis of at least one of information regarding the virtual machine and information regarding traffic on the network. Furthermore, the management device determines a bandwidth control amount of a user traffic bandwidth during live migration so as to reduce a fluctuation from the user traffic bandwidth before the live migration is performed.

Examples of the related art include Japanese Laid-open Patent Publication No. 2008-181461 and Japanese Laid-open Patent Publication No. 2014-153997.

SUMMARY

According to an aspect of the embodiments, provided is a management device configured to manage an information processing system, the information processing system being configured to perform replication processing when a virtual server is migrated from a migration source physical server to a migration destination physical server, the replication processing including replicating data used by the virtual server from a migration source volume of a migration source storage device managed by the migration source physical server to a migration destination volume of a migration destination storage device managed by the migration destination physical server. In an example, the management device includes: a memory; and a processor coupled to the memory, the processor being configured to perform processing, the processing including: determining a Quality of Service (QoS) value of the migration destination volume by using a first throughput and a second throughput, the first throughput being a throughput regarding an access to the migration source storage device of the migration source physical server, the second throughput being a throughput regarding an access to the migration destination storage device of the migration destination physical server; and generating a first command to issue the generated first command to the migration destination storage device, the first command being a command to create the migration destination volume by using the determined QoS value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a virtual server management table;

FIG. 3 is a diagram illustrating an example of a physical volume management table;

FIG. 4 is a diagram illustrating an example of a throughput management table;

FIG. 5 is a diagram illustrating an example of a volume QoS management table;

FIG. 6 is a diagram illustrating an example of a storage management table;

DESCRIPTION OF EMBODIMENTS

In the target cloud platform in which the VM 4a is constructed for each physical resource, there is a case where the VM 4a is migrated to another physical server 94 due to a change in a resource of the VM 4a or the like. In this case, because the physical server 94 and the storage device 96 of the migration source are physically separated from the physical server 94 and the storage device 96 of the migration destination, the migration is performed by copying data after the physical volume 6b is created in the migration destination storage device 96. Therefore, there is a problem in that performance when the other VM 4a using the copy destination storage device 96 and the other VM 4a using the copy source storage device 96 during data copy each access the storage devices 96 is decreased.

According to an aspect of the embodiments, provided is a solution to appropriately set a Quality of Service (QoS) value regarding data copy so as to reduce an effect on a decrease in performance when another VM using a copy destination storage device and other VM using a copy source storage device during data copy each access storage devices.

Hereinafter, embodiments of a management device, an information processing system, and a management program disclosed in the present application will be described in detail with reference to the drawings. Note that the embodiments do not limit the technology disclosed.

Embodiment

Figure 1:
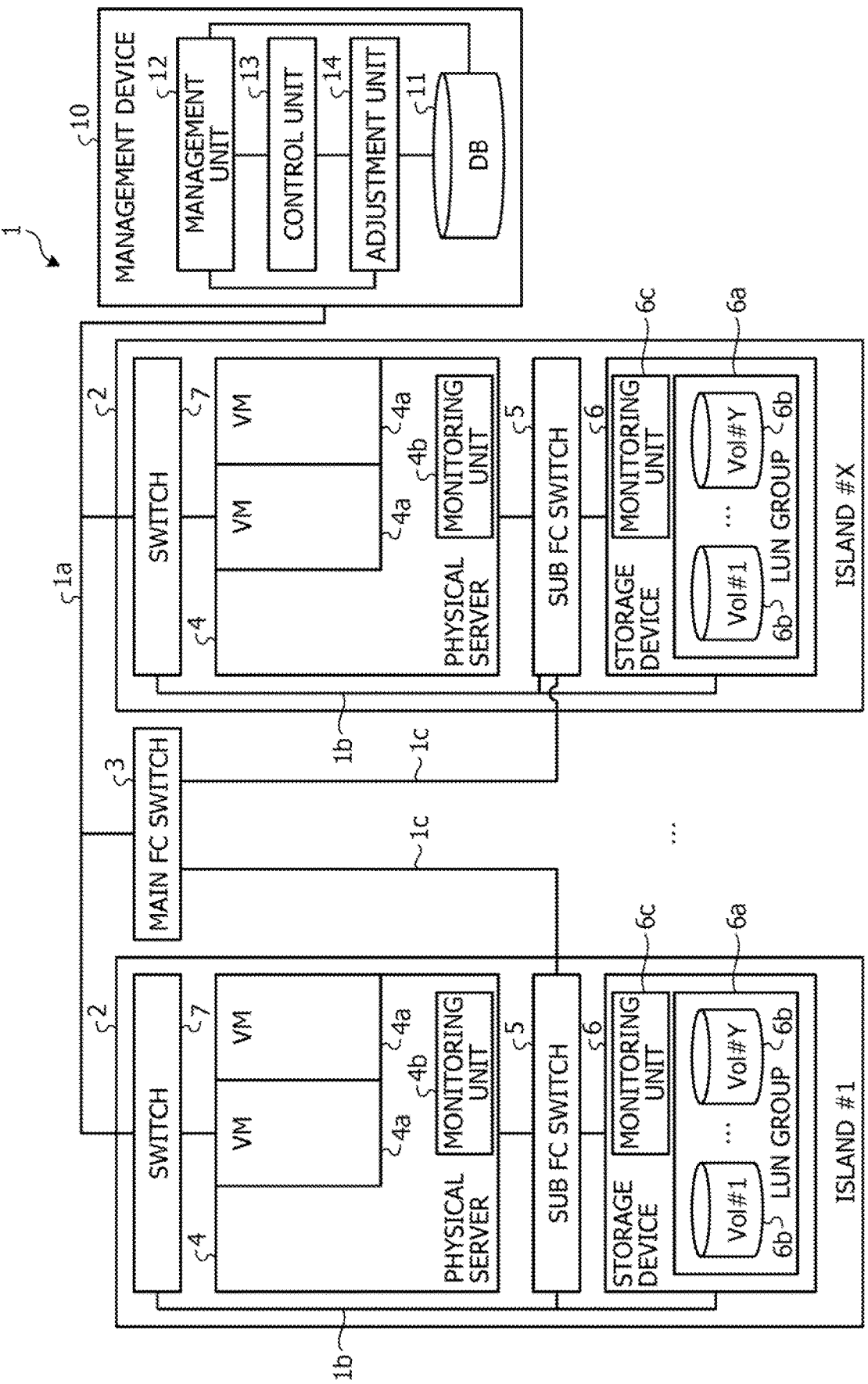
FIG. 1 is a diagram illustrating a configuration of an information processing system according to an embodiment.

First, a configuration of an Information processing system according to an embodiment will be described. FIG. 1 is a diagram illustrating the configuration of the information processing system according to the embodiment. As illustrated in FIG. 1, an information processing system 1 according to the embodiment includes islands 2 represented by an island #1, . . . , and an island #X, a main Fiber Channel (FC) switch 3, and a management device 10. The island 2 includes a physical server 4, a sub FC switch 5, a storage device 6, and a switch 7.

The physical server 4 is an information processing device including a Central Processing Unit (CPU), a main memory, or the like. A VM 4a operates in the physical server 4. Note that two VMs 4a operate in the physical server 4 in FIG. 1. However, three or more VMs 4a may operate in the physical server 4.

The physical server 4 includes a monitoring unit 4b. The monitoring unit 4b cooperates with a monitoring unit 6c of the storage device 6, creates information regarding a throughput (throughput information) of a physical volume 6b at a first time interval (for example, every 10 minutes), and sends the throughput information to the management device 10.

The sub FC switch 5 connects the physical server 4 and the storage device 6. Furthermore, the sub FC switch 5 connects to the storage device 6 and the switch 7 through a network 1b and connects to the main FC switch 3 through a network 1c.

The storage device 6 is a non-volatile storage device that stores data used by the VM 4a. The storage device 6 includes a Logical Unit Number (LUN) group 6a. The VM 4a is associated with the LUN group 6a, and it is not possible to access the unassociated LUN group 6a. The LUN group 6a includes the physical volumes 6b represented by Vol #1, . . . , and Vol #Y. The physical volume 6b stores data used by the VM 4a.

The storage device 6 includes the monitoring unit 6c. The monitoring unit 6c acquires an Input Output Per Second (IOPS) for each physical volume 6b at the first time interval and sends the acquired IOPS to the monitoring unit 4b.

The switch 7 connects the physical server 4 to another physical server 4 and the management device 10 through a network 1a.

The main FC switch 3 connects between the sub FC switches through the network 1c. The main FC switch 3 is used to copy data of the physical volume 6b.

The management device 10 manages the information processing system 1. The management device 10 includes a database (DB) 11, a management unit 12, a control unit 13, and an adjustment unit 14.

The DB 11 stores information used to manage the information processing system 1. The DB 11 stores a virtual server management table, a physical volume management table, a throughput management table, a volume QoS management table, and a storage management table.

Information used to manage the VM 4a is registered in the Virtual server management table. FIG. 2 is a diagram illustrating an example of the virtual server management table. As illustrated in FIG. 2, in the virtual server management table, a virtual server name, a deploy destination physical server name, a physical volume name, and a volume size are registered in association with each other.

The virtual server name is a name that identifies the VM 4a. The deploy destination physical server name is a name that identifies the physical server 4 on which the VM 4a is deployed. The physical volume name is a name that identifies the physical volume 6b accessed by the VM 4a. The volume size is a size of the physical volume 6b accessed by the VM 4a. For example, "VM1" deployed on "Server1" accesses "Volume1" of "1000 GB (gigabyte)".

Information used to manage the physical volume 6b is registered in the physical volume management table. FIG. 3 is a diagram illustrating an example of the physical volume management table. As illustrated in FIG. 3, in the physical volume management table, a storage device name, an access destination physical server name, and a physical volume name are registered in association with each other.

The storage device name is a name that identifies the storage device 6 including the physical volume 6b. The access destination physical server name is a name that identifies the physical server 4 that accesses the physical volume 6b. The physical volume name is a name that identifies the physical volume 6b. For example, "Volume1" is in "Storage1" and is accessed by "Server1".

Information used to manage a throughput of the physical volume 6b is registered in the throughput management table. FIG. 4 is a diagram illustrating an example of the throughput management table. As illustrated in FIG. 4, in the throughput management table, a virtual server name, a physical server name, a physical volume name, an IOPS, a storage device name, and a collection time are registered in association with each other.

The virtual server name is a name that identifies the VM 4a that accesses the physical volume 6b. The physical server name is a name that identifies the physical server 4 that accesses the physical volume 6b. The physical volume name is a name that identifies the physical volume 6b. The IOPS is the number of accesses to the physical volume 6b per second and indicates an input/output access (IO) throughput. The storage device name is a name that identifies the storage device 6 including the physical volume 6b. The collection time is a date and time when the IOPS is collected. For example, according to data collected at "2019-11-11 10:00: 00", "Volume1" in "Storage1" is accessed by "VM1" that operates in "Server1" "100" times per second.

Information used to set the QoS value of the physical volume 6b is registered in the volume QoS management table. FIG. 5 is a diagram illustrating an example of the volume QoS management table. As illustrated in FIG. 5, in the volume QoS management table, an IOPS, a volume QoS, and a bandwidth are registered in association with each other.

The IOPS is the number of accesses to the physical volume 6b per second. The volume QoS is a QoS value set to the physical volume 6b. The bandwidth indicates a maximum data transfer amount of the volume (MB (megabyte)/s (seconds) or the like) and is allocated to the physical volume 6b. For example, the IOPS of the physical volume 6b to which "3" is set as the volume QoS is "100", and a bandwidth allocated to the physical volume 6b is "100".

A maximum performance of the storage device 6 is registered in the storage management table. FIG. 6 is a diagram illustrating an example of the storage management table. As illustrated in FIG. 6, in the storage management table, a storage device name and a maximum IOPS are registered in association with each other.

The storage device name is a name that identifies the storage device 6. The maximum IOPS is a maximum performance represented by using the IOPS. For example, the maximum performance of "Storage1" is "300000" IOPSs.

The management unit 12 manages the DB 11. For example, the management unit 12 receives the configuration information from the operator of the cloud service and registers the configuration information in the virtual server management table, the physical volume management table, the volume QoS management table, and the storage management table.

Furthermore, the management unit 12 receives the throughput information from the monitoring unit 4b at the first time interval. The throughput information includes the virtual server name, the physical server name, the physical volume name, the IOPS, the storage device name, and the collection time. When receiving the throughput information, the management unit 12 registers the throughput information in the throughput management table.

Furthermore, when receiving the changed configuration information from the operator of the cloud service, the management unit 12 compares the received information with the information registered in the virtual server management table and determines whether or not there is a VM 4a to be migrated. The information registered in the virtual server management table indicates the physical server 4 before the migration, and the configuration information indicates the migrated physical server 4.

Then, in a case where there is a VM 4a to be migrated, the management unit 12 instructs the adjustment unit 14 to create the migration destination physical volume 6b and to set the QoS value. Furthermore, the management unit 12 compares the physical volume management table with the changed configuration information and specifies a migration source storage device 6 and a migration destination storage device 6 of the physical volume 6b used by the VM 4a to be migrated. Then, the management unit 12 instructs the control unit 13 to acquire World Wide Names (WWN) of data transfer ports of the migration source storage device 6 and the migration destination storage device 6. Furthermore, the management unit 12 compares the physical volume management table with the changed configuration information and instructs the control unit 13 to copy data from a migration source physical volume 6b to a migration destination physical volume 6b.

Furthermore, the management unit 12 refers to the virtual server management table and instructs the control unit 13 to stop the VM 4a to be migrated. Furthermore, the management unit 12 compares the virtual server management table with the changed configuration information and instructs the control unit 13 to migrate the VM 4a. Furthermore, the management unit 12 refers to the changed configuration information and instructs the control unit 13 to activate the migrated VM 4a.

Furthermore, the management unit 12 instructs the control unit 13 to monitor the data copy from the migration source physical volume 6b to the migration destination physical volume 6b. Then, the management unit 12 determines whether the data copy has been completed at a second time interval. In a case where the data copy has not been completed, the management unit 12 instructs the adjustment unit 14 to reset a QoS value of the migration destination physical volume 6b and a QoS value of the data transfer route. On the other hand, in a case where the data copy has been completed, the management unit 12 instructs the control unit 13 to delete the migration source physical volume 6b and to delete the data transfer route.

The control unit 13 creates a command (script) executed by the main FC switch 3, the physical server 4, and the storage device 6 and issues the commands to the main FC switch 3, the physical server 4, and the storage device 6.

For example, in response to the instruction from the adjustment unit 14, the control unit 13 creates a command to create the migration destination physical volume 6b by using the QoS value calculated by the adjustment unit 14 and issues the command to the migration destination storage device 6. Furthermore, in response to the instruction from the management unit 12, the control unit 13 creates a command to acquire the WWN of the data transfer port and issues the command to the migration source storage device 6 and the migration destination storage device 6. Furthermore, in response to the instruction from the management unit 12, the control unit 13 creates a command to acquire the WWNs of the data transfer ports of the migration source storage device 6 and the migration destination storage device 6 and issues the command to the main FC switch 3.

Furthermore, in response to the instruction from the adjustment unit 14, the control unit 13 creates a command to set a route by using the WWN of the data transfer port and a priority (QoS value) determined by the adjustment unit 14 and issues the command to the main FC switch 3. Furthermore, in response to the instruction from the management unit 12, the control unit 13 creates a command to copy data from the migration source physical volume 6b to the migration destination physical volume 6b and issues the command to the migration source storage device 6 and the migration destination storage device 6.

Furthermore, in response to the instruction from the management unit 12, the control unit 13 creates a command to stop the VM 4a to be migrated and issues the command to the migration source physical server 4. Furthermore, in response to the instruction from the management unit 12, the control unit 13 creates a command to migrate the VM 4a and issues the command to the migration source physical server 4 and the migration destination physical server 4. Furthermore, in response to the instruction from the management unit 12, the control unit 13 creates a command to activate the migrated VM 4a and issues the command to the migration destination physical server 4.

Furthermore, in response to the instruction from the management unit 12, the control unit 13 creates a command to monitor the data copy from the migration source physical volume 6b to the migration destination physical volume 6b and issues the command to the migration destination storage device 6. Furthermore, in a case where the data copy has not been completed, the control unit 13 creates a command to reset the QoS values of the migration destination physical volume 6b and the route in response to the instruction from the adjustment unit 14 and issues the command to the migration destination storage device 6. Furthermore, in a case where the data copy has been completed, the control unit 13 creates a command to delete the migration source physical volume 6b and a command to delete the data transfer route in response to the instruction from the management unit 12 and respectively issues the created commands to the storage device 6 and the main FC switch 3.

The adjustment unit 14 adjusts the QoS value of the migration destination physical volume 6b on the basis of load conditions of the migration source storage device 6 and the migration destination storage device 6. Furthermore, the adjustment unit 14 adjusts the QoS value of the data transfer route on the basis of the number of data copy processes of the data transfer port.

For example, the adjustment unit 14 acquires the maximum IOPSs of the migration source storage device 6 and the migration destination storage device 6 from the storage management table. Furthermore, the adjustment unit 14 sets a service upper limit threshold (for example, 70%) and a service lower limit threshold (for example, 30%) used for a task process of the VM 4a among the maximum IOPS of the storage device 6. Moreover, the adjustment unit 14 sets the maximum threshold (for example, 90%) of the actual IOPS. Here, the actual IOPS is an IOPS based on an actual access status. Furthermore, the adjustment unit 14 calculates actual IOPSs of the migration source physical server 4 and the migration destination physical server 4 from the throughput management table and selects the larger actual IOPS.

Then, the adjustment unit 14 compares the selected actual IOPS with a service upper limit IOPS obtained by a product of the service upper limit threshold and the maximum IOPS. Then, in a case where the actual IOPS exceeds the service upper limit IOPS (when service is busy), the adjustment unit 14 calculates a value obtained by subtracting the actual IOPS from the maximum IOPS as the data copy IOPS. However, at the time when the service is busy, in a case where the actual IOPS exceeds the product of the maximum IOPS and the maximum threshold of the actual IOPS, the actual IOPS is limited to a product of the maximum IOPS and the maximum threshold of the actual IOPS in order to secure a minimum data copy IOPS. On the other hand, in a case where the actual IOPS is equal to or less than the service upper limit IOPS, the adjustment unit 14 compares the actual IOPS with a service lower limit IOPS obtained by a product of the service lower limit threshold and the maximum IOPS. Then, in a case where the actual IOPS exceeds the service lower limit IOPS (service normal time), the adjustment unit 14 calculates a value obtained by subtracting the product of the maximum IOPS and the service upper limit threshold from the maximum IOPS as the data copy IOPS. On the other hand, in a case where the actual IOPS is equal to or less than the service lower limit IOPS (when service is not busy), the adjustment unit 14 calculates a value obtained by subtracting the product of the maximum IOPS and the service lower limit threshold from the maximum IOPS as the data copy IOPS.

Figure 7:
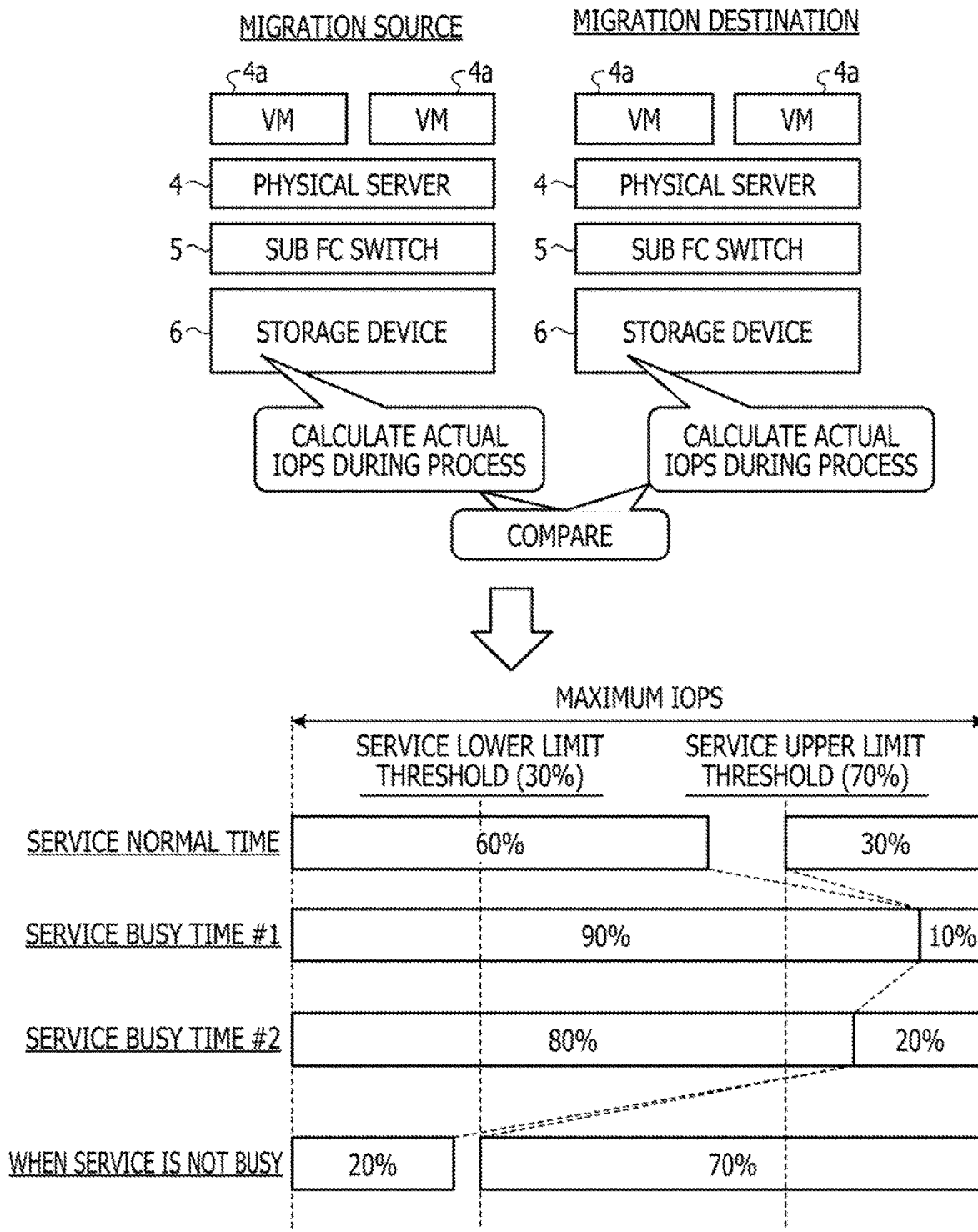
FIG. 7 is a diagram illustrating a calculation example of a data copy Input Output Per Second (IOPS)

FIG. 7 is a diagram illustrating a calculation example of the data copy IOPS. In FIG. 7, the service upper limit threshold is 70%, and the service lower limit threshold is 30%. Furthermore, it is assumed that the maximum threshold of the actual IOPS be 90%. As illustrated in FIG. 7, the adjustment unit 14 compares the actual IOPSs of the migration source physical server 4 and the migration destination physical server 4 and selects the larger actual IOPS. Then, in a case where the selected actual IOPS exceeds the service upper limit IOPS and is 95% of the maximum IOPS (service busy time #1), the adjustment unit 14 limits the actual IOPS to 90% of the maximum IOPS and calculates 10% of the actual IOPS as the data copy IOPS in order to secure the data copy IOPS. Furthermore, in a case where the selected actual IOPS exceeds the service upper limit IOPS and is 80% of the maximum IOPS (service busy time #2, in a case of not exceeding maximum threshold of actual IOPS), the adjustment unit 14 calculates a value obtained by subtracting the actual IOPS from the maximum IOPS (20% of maximum IOPS) as the data copy IOPS. Furthermore, in a case where the selected actual IOPS is equal to or less than the service lower limit IOPS and is 20% of the maximum IOPS (when service is not busy), the adjustment unit 14 calculates a value obtained by subtracting the service lower limit IOPS from the maximum IOPS (70% of maximum IOPS) as the data copy IOPS. Furthermore, in a case where the selected actual IOPS exceeds the service lower limit IOPS and is 60% of the service upper limit IOPS (service normal time), the adjustment unit 14 calculates a value obtained by subtracting the service upper limit IOPS from the maximum IOPS (30% of maximum IOPS) as the data copy IOPS.

Then, the adjustment unit 14 calculates a volume QoS corresponding to the IOPS closest to the data copy IOPS from the volume QoS management table as the QoS value of the migration destination physical volume 6b. Then, the adjustment unit 14 instructs the control unit 13 to create the migration destination physical volume 6b by using the calculated QoS value.

Furthermore, by receiving a response to the command to acquire the WWN which has been issued by the control unit 13 to the main FC switch 3 from the main FC switch 3, the adjustment unit 14 acquires the WWNs of the data transfer ports of the migration source storage device 6 and the migration destination storage device 6. Then, the adjustment unit 14 calculates the number of data copy processes of the data transfer port for each of the migration source storage device 6 and the migration destination storage device 6. Then, in a case where the number of data copy processes is not plural, the adjustment unit 14 determines that the priority of the data transfer route is high. On the other hand, in a case where the number of data copy processes is plural, the adjustment unit 14 determines that a priority of a route having the largest data size is high and a priority of the other route is medium. Note that the adjustment unit 14 may determine the priority of the route on the basis of the types of the migration source storage device 6 and the migration destination storage device 6.

Figure 8B:
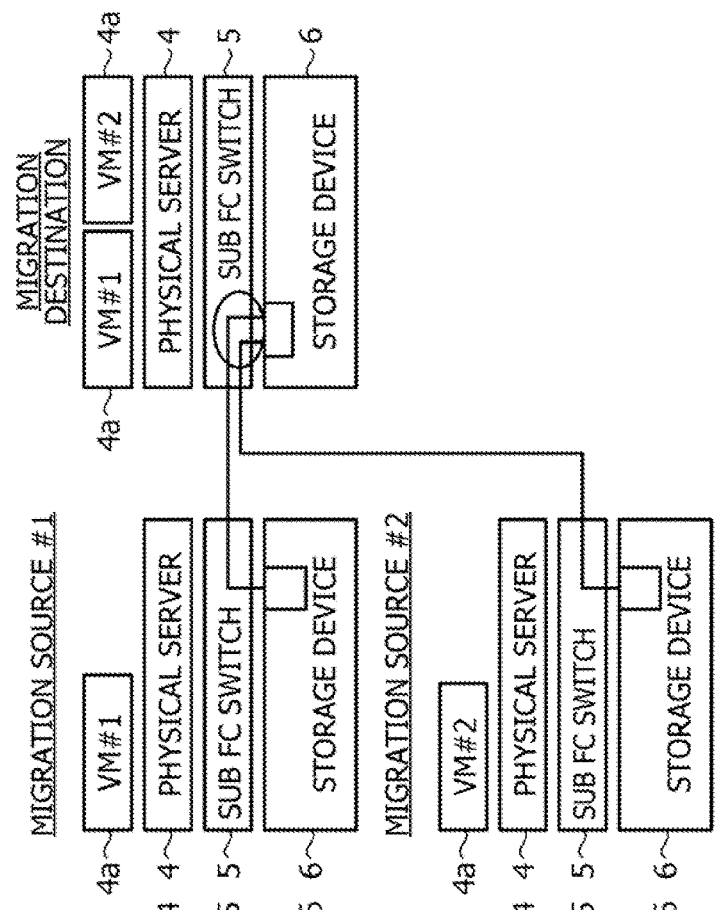
FIGS. 8A and 8B are diagrams illustrating a case where the number of data copy processes of a data transfer port is two.
Figure 8A:
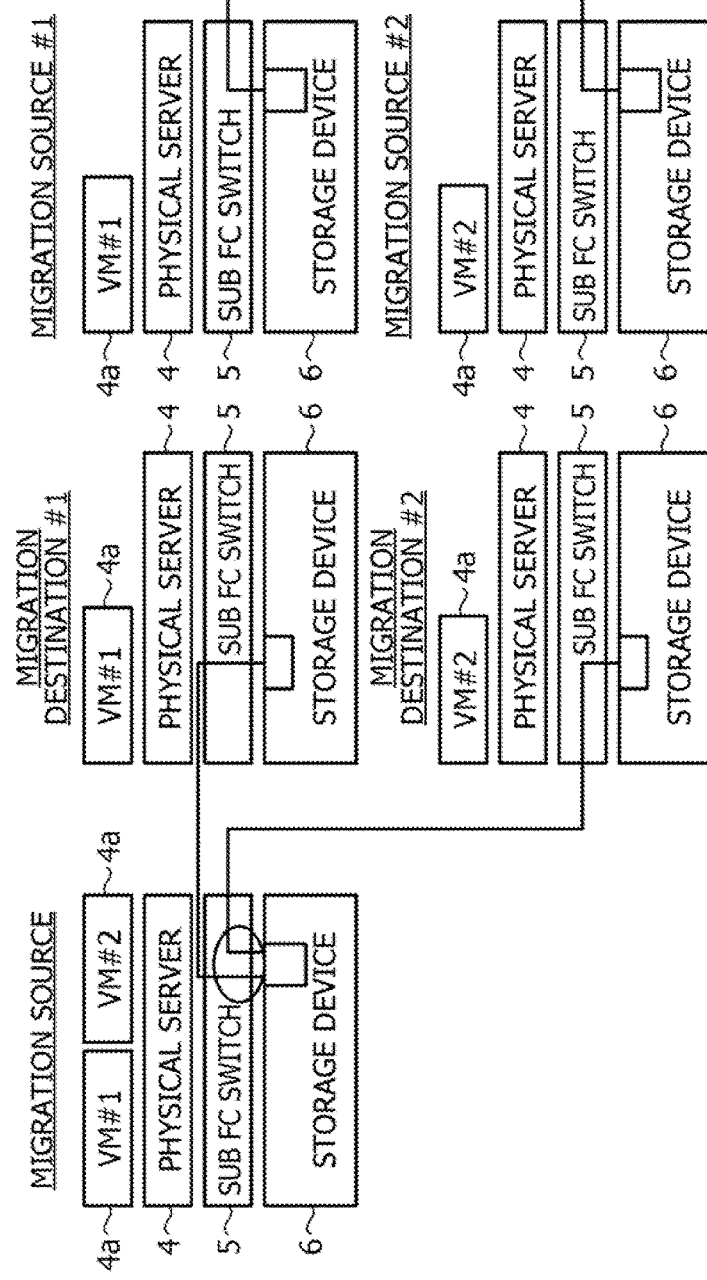

FIGS. 8A and 8B are diagrams illustrating a case where the number of data copy processes of the data transfer port is two. FIG. 8A illustrates a case where the number of data copy processes of the migration source data transfer port is two, and FIG. 8B illustrates a case where the number of data copy processes of the migration destination data transfer port is two. In FIGS. 8A and 8B, each of VM #1 and VM #2 represents the VM 4a.

As illustrated in FIG. 8A, VM #1 and VM #2 that operate in the physical server 4 of the migration source are respectively migrated to a physical server 4 of a migration destination #1 and a physical server 4 of a migration destination #2. At this time, two data copy processes are performed in the migration source data transfer port. Therefore, the adjustment unit 14 compares the size of the physical volume 6b that is copied according to the migration of VM #1 and the size of the physical volume 6b copied according to the migration of VM #2 and sets the priority of the data copy route of the larger physical volume 6b to be higher.

As illustrated in FIG. 8B, VM #1 and VM #2 that operate in the physical server 4 of the migration destination are respectively migrated from a physical server 4 of a migration source #1 and a physical server 4 of a migration source #2. At this time, two data copy processes are performed in the migration destination data transfer port. Therefore, the adjustment unit 14 compares the size of the physical volume 6b that is copied according to the migration of VM #1 and the size of the physical volume 6b copied according to the migration of VM #2 and sets the priority of the data copy route of the larger physical volume 6b to be higher.

Furthermore, in a case where the data copy has not been completed, the adjustment unit 14 calculates the QoS value of the migration destination physical volume 6b again on the basis of the instruction of the management unit 12 and instructs the control unit 13 to reset the QoS value of the migration destination physical volume 6b.

Figure 9:
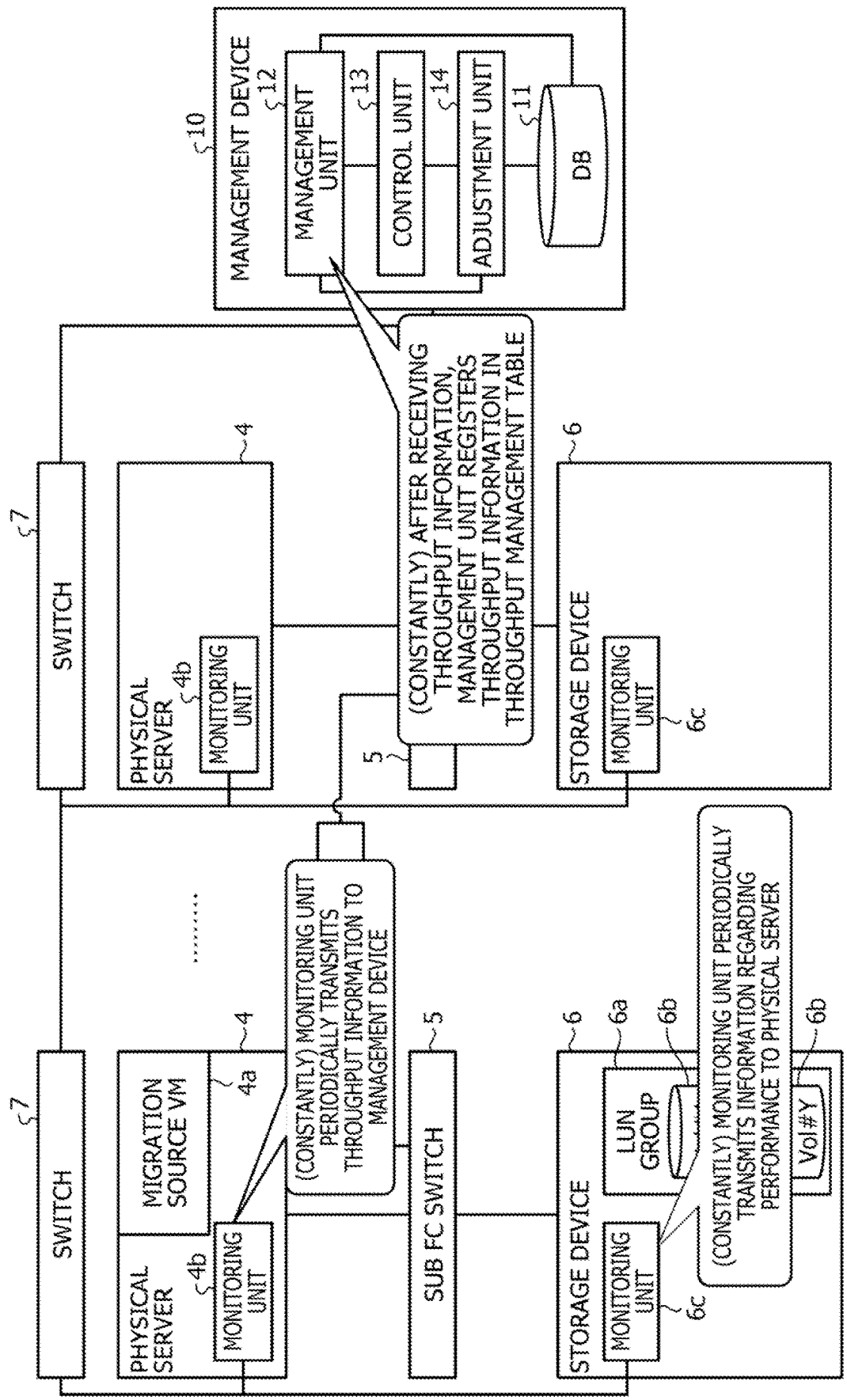
FIG. 9 is a diagram illustrating an information collection operation.

Next, an operation of the information processing system 1 regarding data copy will be described with reference to FIGS. 9 to 14. FIG. 9 is a diagram illustrating an information collection operation. As illustrated in FIG. 9, the monitoring unit 4b of the physical server 4 collects information regarding the performance from the monitoring unit 6c of the storage device 6 periodically (at first time Interval), creates the throughput information on the basis of the collected information, and transmits the throughput information to the management device 10. When receiving the throughput information, the management unit 12 of the management device 10 registers the throughput information in the throughput management table.

Figure 10:
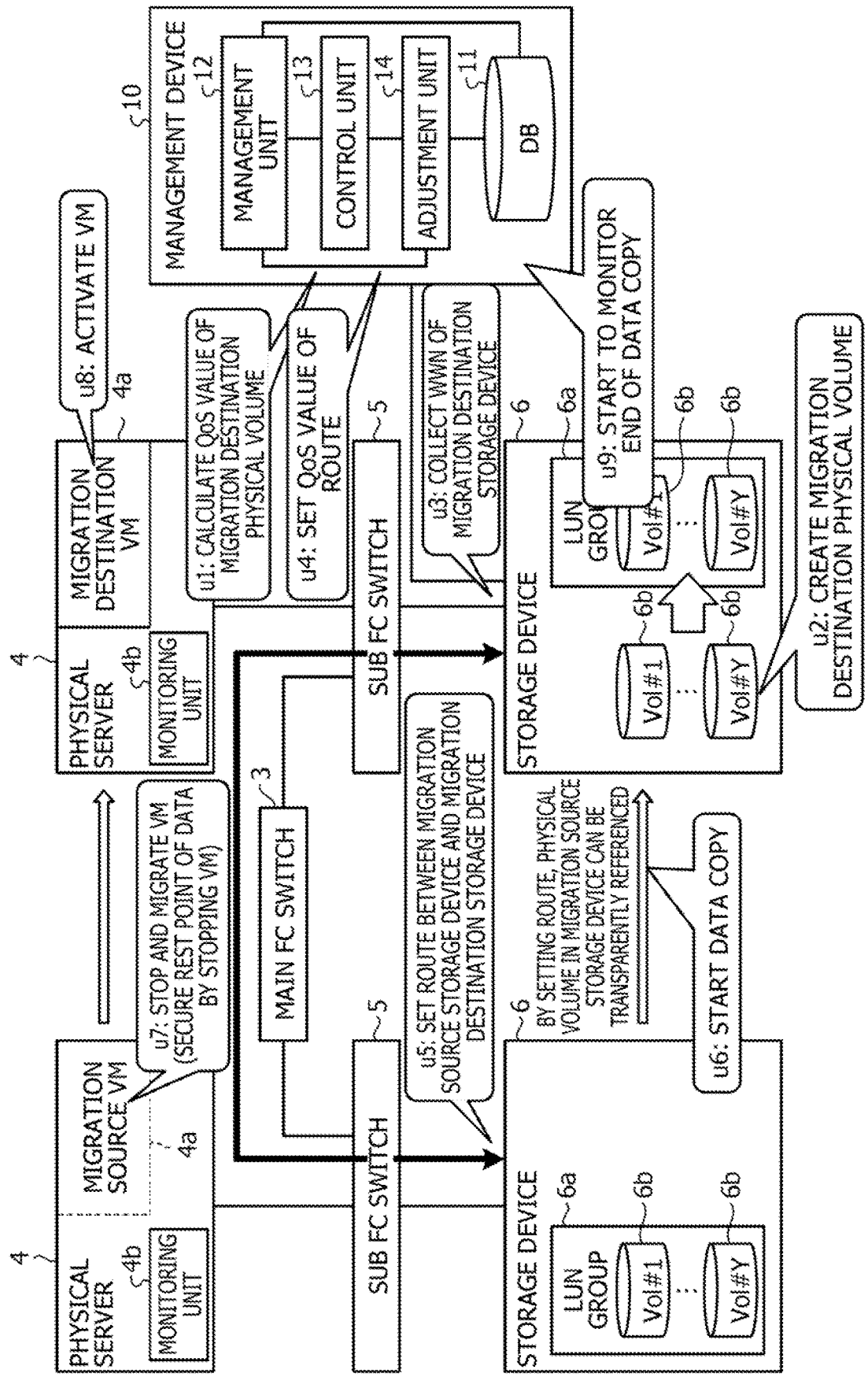
FIG. 10 is a diagram illustrating a VM migration operation.

FIG. 10 is a diagram illustrating a VM migration operation. As illustrated in FIG. 10, when determining that the VM 4a is migrated, the management device 10 calculates the QoS value of the migration destination physical volume 6b (u1). Then, the storage device 6 creates the migration destination physical volume 6b (u2) and sets the QoS value calculated by the adjustment unit 14.

Then, the management device 10 instructs the main FC switch 3 to collect the WWN of the data transfer port of the migration destination storage device 6 (u3) and sets the QoS value of the data transfer route (u4). Then, the main FC switch 3 sets the route between the migration source storage device 6 and the migration destination storage device 6 (u5). By setting the route, the physical volume 6b in the migration source storage device can be transparently referenced from the migration source storage device 6.

Then, the migration source storage device 6 and the migration destination storage device 6 start to copy data (u6). Then, the migration source physical server 4 stops the VM 4a to be migrated and migrates the VM 4a to be migrated in cooperation with the migration destination physical server 4 (u7). By stopping the VM 4a to be migrated, the information processing system 1 can secure a rest point of data to be copied. Then, the migration destination physical server 4 activates the migrated VM 4a (u8). Then, the management device 10 starts to monitor the end of data copy (u9). Note that the migration destination physical volume 6b is put into the LUN group 6a when a volume is created.

Figure 11:
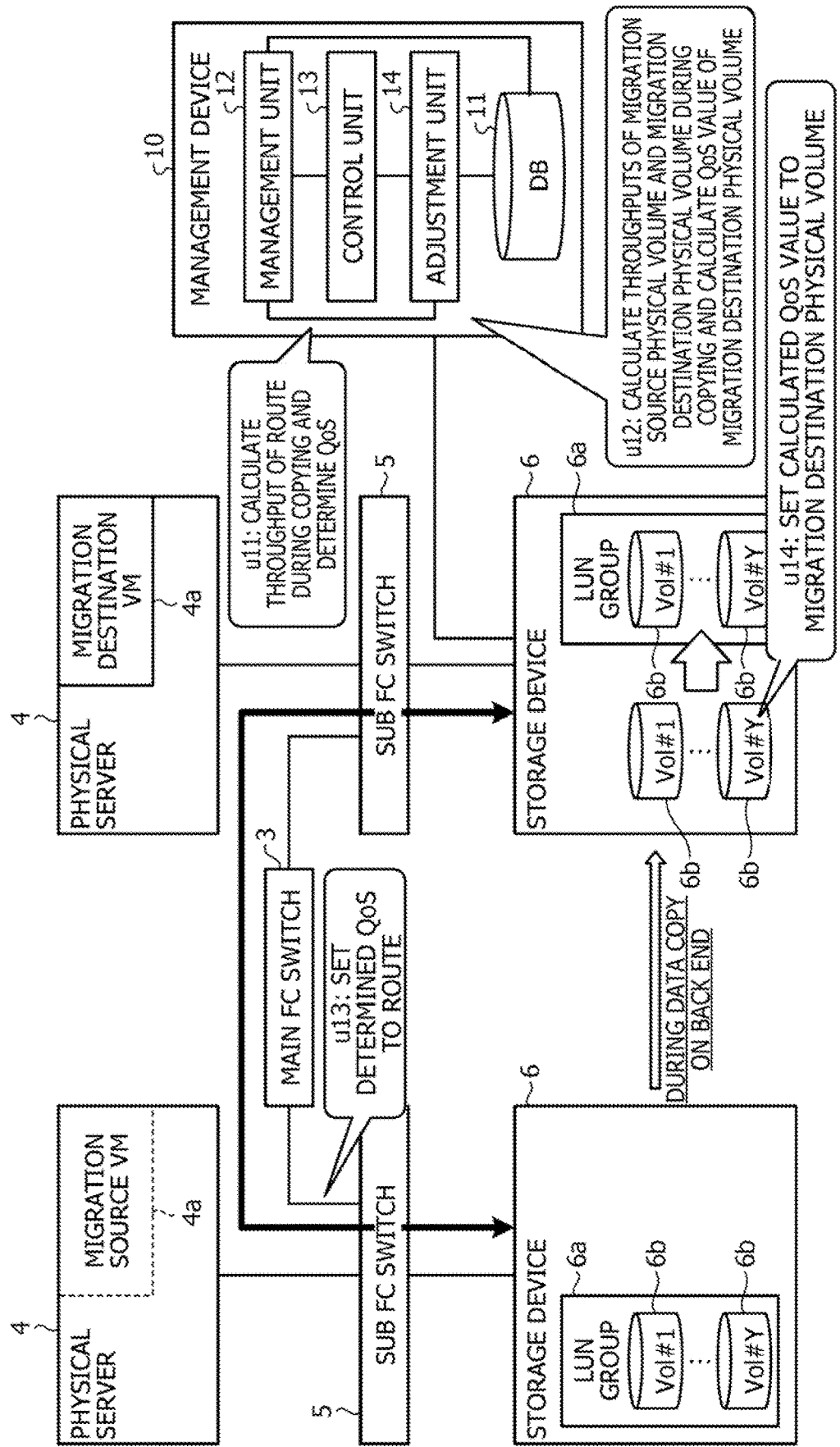
FIG. 11 is a diagram illustrating a QoS control operation during data copy.

FIG. 11 is a diagram illustrating a QoS control operation during data copy. As illustrated in FIG. 11, the management device 10 calculates a throughput of a route during copying and determines the QoS value (u11). Then, the management device 10 calculates throughputs of the migration source physical volume 6b and the migration destination physical volume 6b during copying and calculates the QoS value of the migration destination physical volume 6b (u12).

Then, the main FC switch 3 sets the QoS value determined by the management device 10 to the route (u13). Then, the migration destination storage device 6 sets the QoS value calculated by the management device 10 to the migration destination physical volume 6b (u14).

Figure 12:
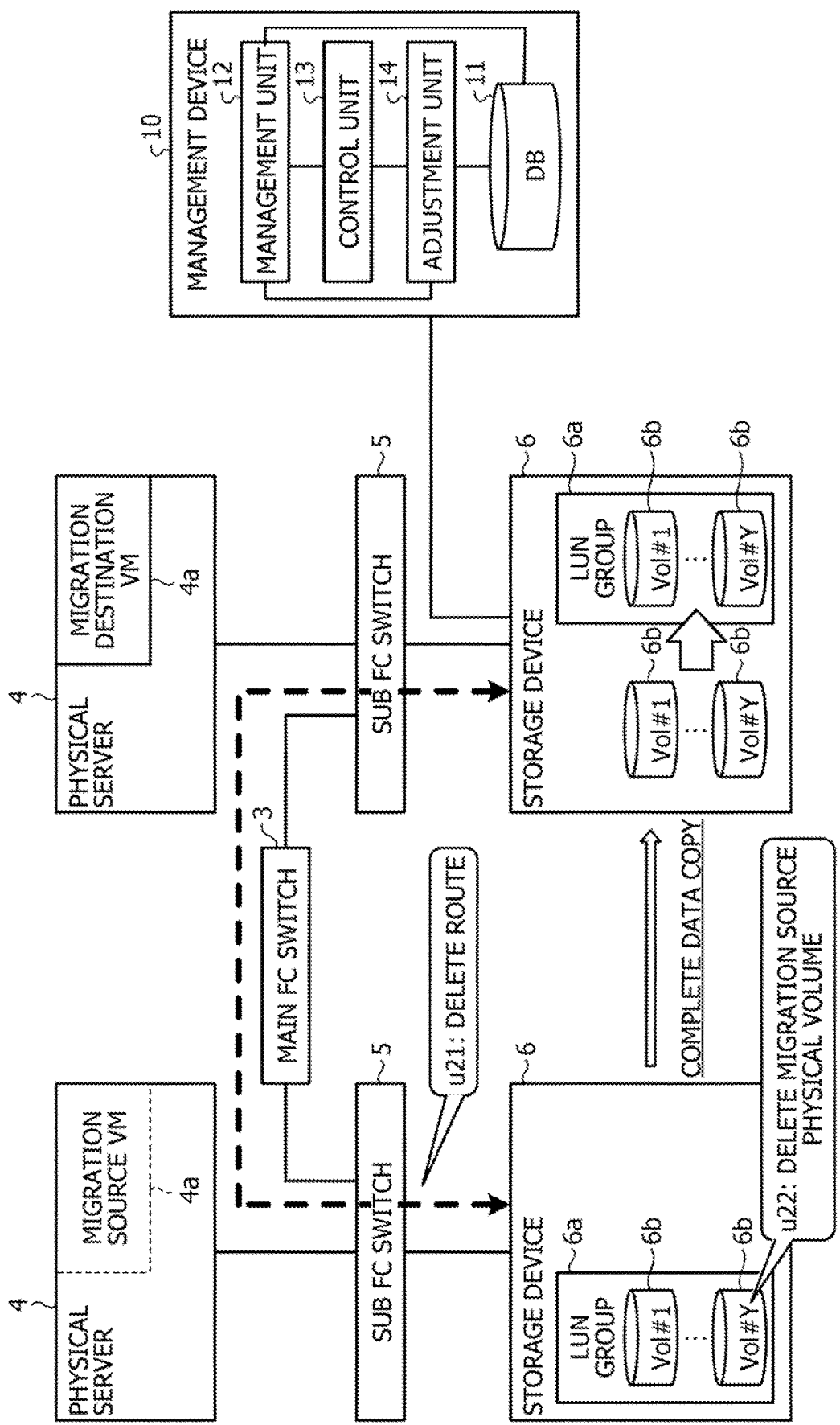
FIG. 12 is a diagram illustrating an operation after the data copy has been completed.

FIG. 12 is a diagram illustrating an operation after the data copy has been completed. As illustrated in FIG. 12, the main FC switch 3 deletes the data transfer route (u21). Then, the migration source storage device 6 deletes the migration source physical volume 6b (u22).

Figure 13:
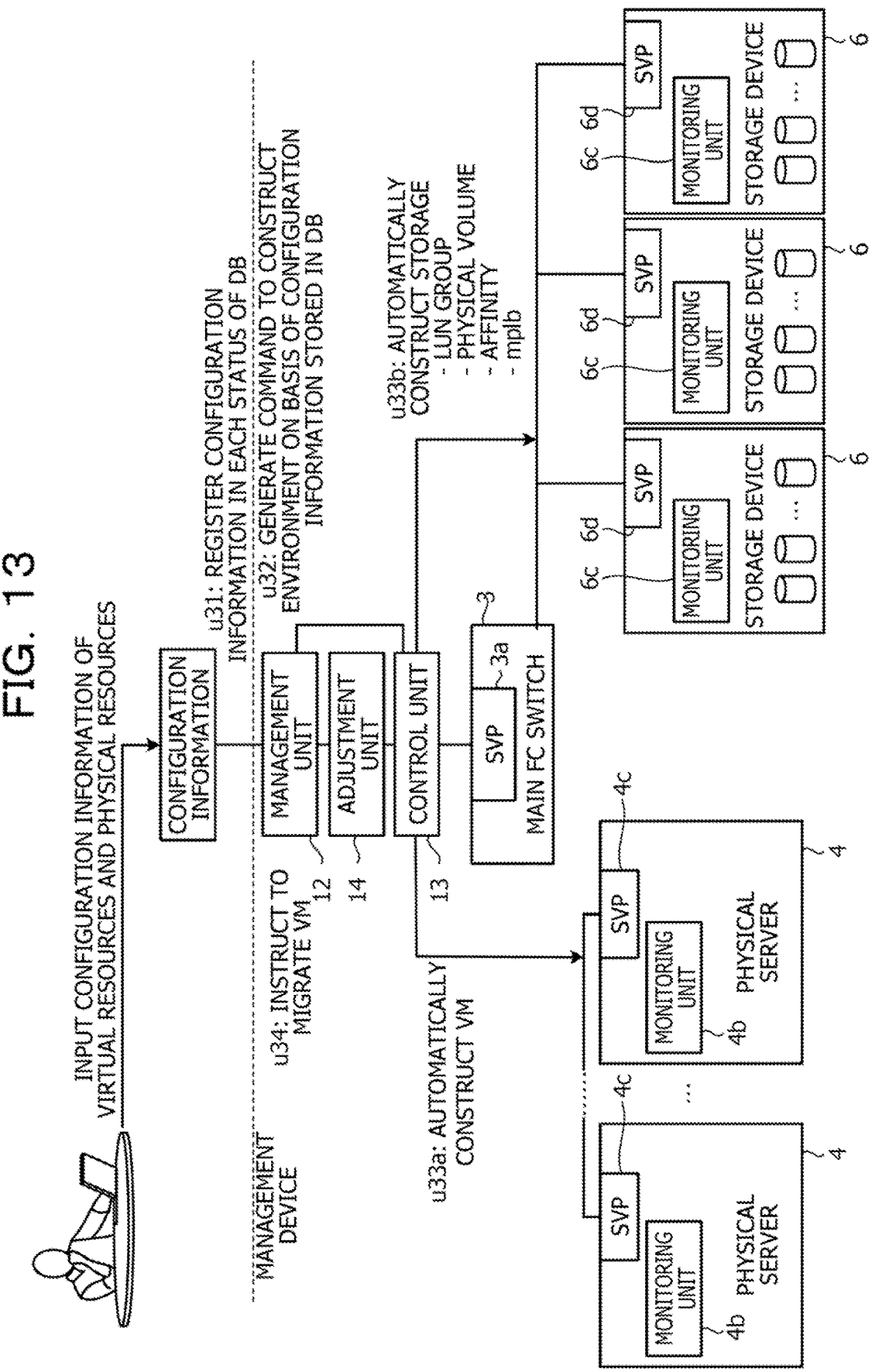
FIG. 13 is a diagram illustrating an operation of a management device when configuration information is received from an operator of a cloud service.

FIG. 13 is a diagram illustrating an operation of the management device 10 when the configuration information is received from the operator of the cloud service. As illustrated in FIG. 13, when receiving the configuration information from the operator of the cloud service first, the management device 10 registers the configuration information in each table of the DB 11 (u31).

Then, the management device 10 generates a command to construct environment on the basis of the configuration information stored in the DB 11 (u32) and issues the command to the main FC switch 3, the physical server 4, and the storage device 6.

As depicted in FIG. 13, each of the main FC switch 3, the physical server 4, and the storage device 6 includes a their respective SerVice Processer (SVP). For instance, the main FC switch 3 includes the SVP 3a, the physical server 4 includes the SVP 4c, and the storage device 6 includes the SVP 6d. The SVP 3a executes the command issued by the management device 10, and for example, sets a route and sets a QoS value to the route in cooperation with the sub FC switch 5. The SVP 4c executes the command issued by the management device 10 and automatically constructs the VM 4a (u33a). The SVP 6d executes the command issued by the management device 10 and automatically constructs a storage (u33b). The automatic construction of the storage includes setting of the LUN group 6a, the physical volume 6b, an affinity, a MultiPath disk control Load Balancing option (mplb), or the like.

Thereafter, when receiving a change in the configuration information from the operator of the cloud service, the management device 10 compares the received configuration information with information registered in each table, and issues commands to the main FC switch 3, the physical server 4, and the storage device 6 on the basis of difference information. For example, in a case where the VM 4a is deployed in a different physical server 4, the management device 10 instructs to migrate the VM 4a (u34).

In this way, in a case where the change in the configuration information is received and the VM 4a is deployed in the different physical server 4, the management device 10 instructs to migrate the VM 4a. Therefore, the operator of the cloud service can migrate the VM 4a by changing the configuration information.

Figure 14:
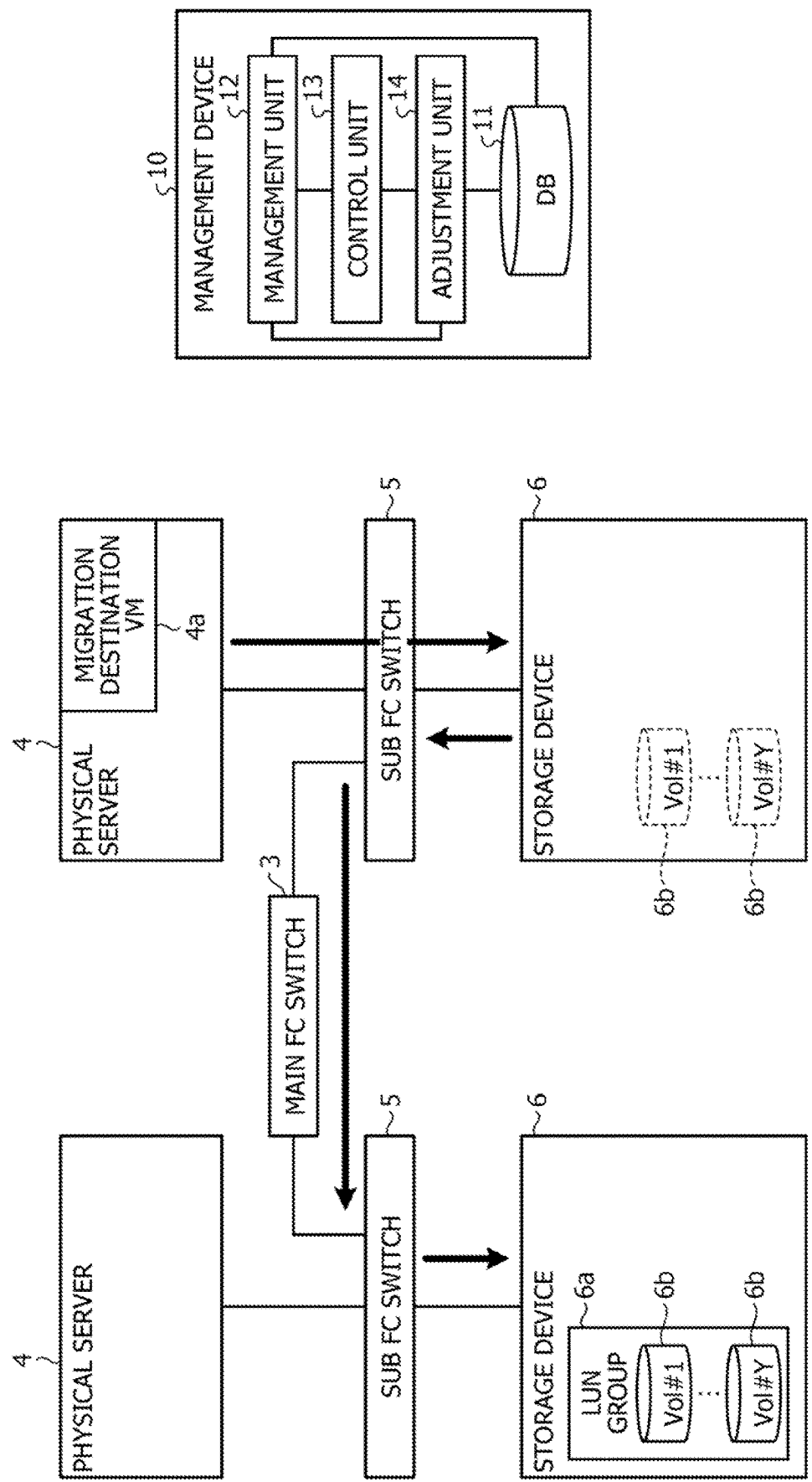
FIG. 14 is a diagram illustrating an access route when user data is accessed during data copy after the VM migration.

FIG. 14 is a diagram illustrating an access route when user data is accessed during data copy after the VM 4a has been migrated. As illustrated in FIG. 14, when the migrated VM 4a accesses the physical volume 6b, the physical volume 6b accessed by the VM 4a before being migrated is accessed via the main FC switch 3.

Figure 15:
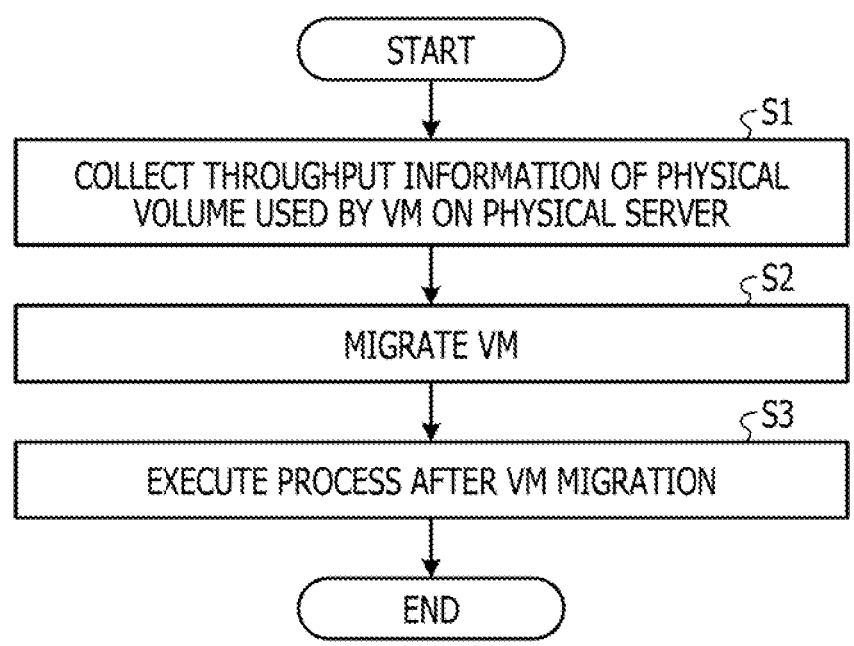
FIG. 15 is a flowchart illustrating a flow of a process for the information processing system regarding data copy.

Next, a flow of a process of the information processing system 1 regarding data copy will be described with reference to FIGS. 15 to 20. FIG. 15 is a flowchart illustrating the flow of the process of the information processing system 1 regarding data copy. As illustrated in FIG. 15, the information processing system 1 collects throughput information of the physical volume 6b used by the VM 4a on the physical server 4 (step S1). Then, the information processing system 1 migrates the VM 4a (step S2). Then, the information processing system 1 executes a process after the VM 4a has been migrated (step S3).

Figure 16:
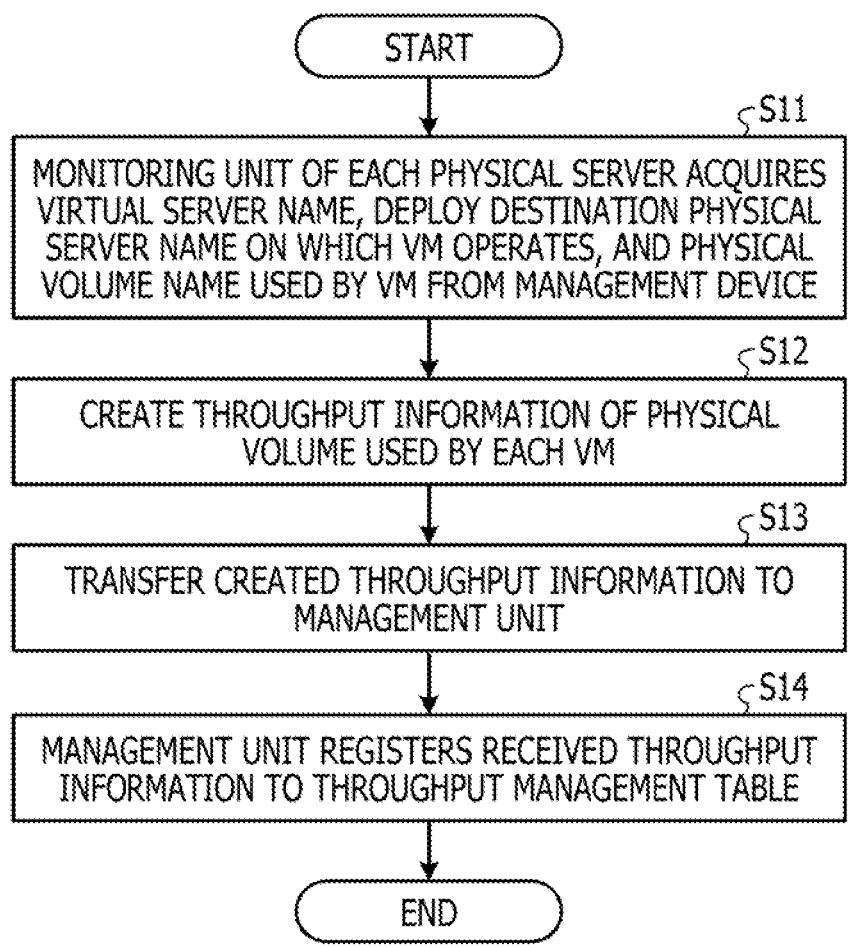
FIG. 16 is a flowchart illustrating a flow of a process for collecting throughput information of a physical volume used by a VM on a physical server.

FIG. 16 is a flowchart illustrating a flow of a process for collecting the throughput information of the physical volume 6b used by the VM 4a on the physical server 4. As illustrated in FIG. 16, the monitoring unit 4b of each physical server 4 acquires a virtual server (VM) name, a deploy destination physical server name on which the VM 4a operates, and a physical volume name used by the VM 4a from the management device 10 (step S11).

Then, the monitoring unit 4b of each physical server 4 creates throughput information of the physical volume 6b used by each VM 4a in cooperation with the monitoring unit 6c of the storage device 6 (step S12) and transfers the created throughput information to the management unit 12 (step S13). Then, the management unit 12 registers the received throughput information in the throughput management table (step S14).

In this way, because the monitoring unit 4b transfers the throughput information of the physical volume 6b to the management unit 12, the management device 10 can determine the QoS value of the migration destination physical volume 6b on the basis of the throughputs of the migration source storage device 6 and the migration destination storage device 6.

Figure 17:
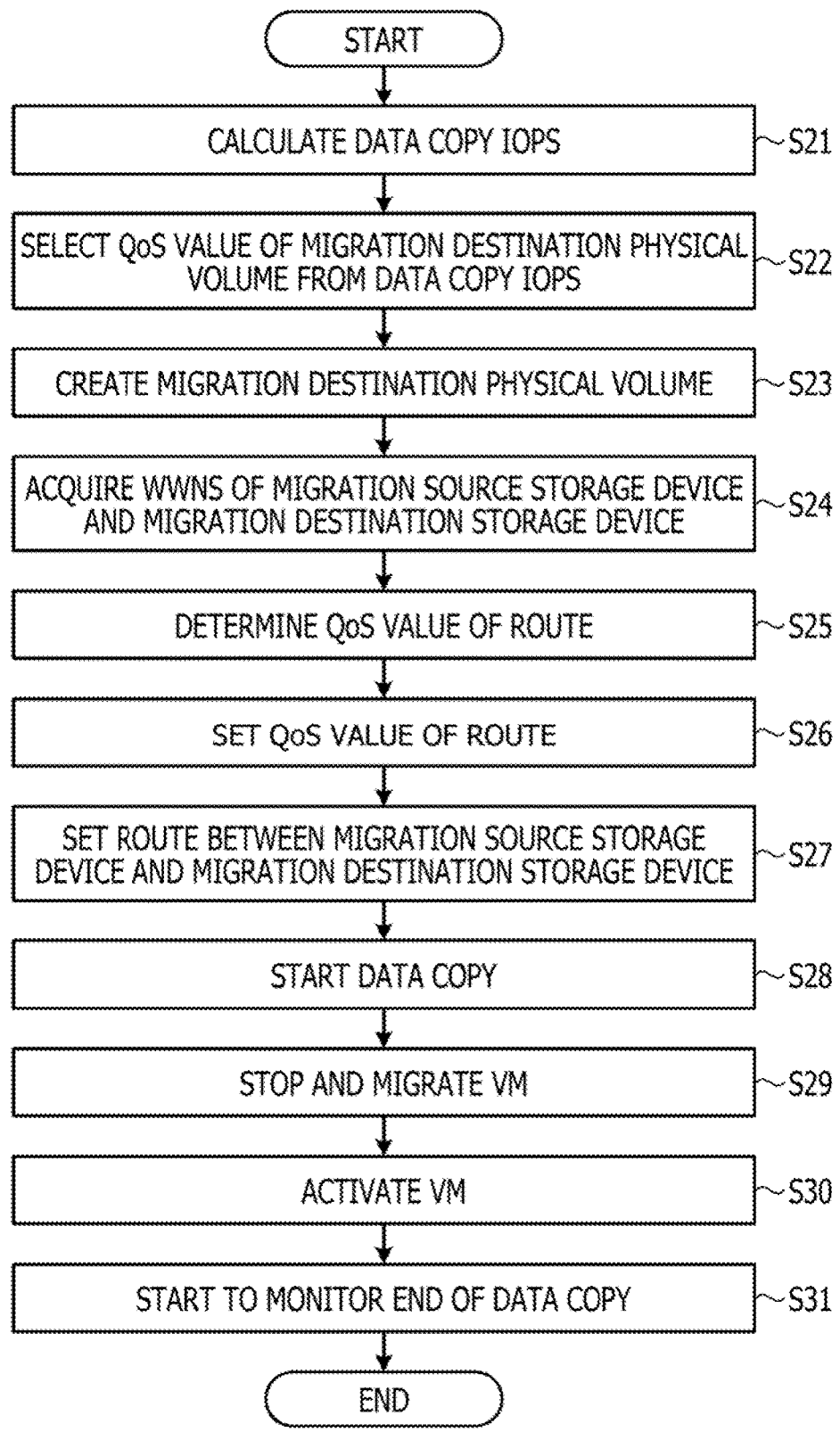
FIG. 17 is a flowchart illustrating a flow of a process for migrating the VM.

FIG. 17 is a flowchart illustrating a flow of a process for migrating the VM 4a. As illustrated in FIG. 17, the management device 10 calculates the data copy IOPS (step S21), refers to the volume QoS management table, and selects a QoS value of the migration destination physical volume 6b from the data copy IOPS (step S22).

Then, the management device 10 instructs the storage device 6 to create the migration destination physical volume 6b with the selected QoS value (step S23). Then, the management device 10 acquires the WWNs of the migration source storage device 6 and the migration destination storage device 6 (step S24) and determines a QoS value of the data transfer route (step S25). Then, the management device 10 instructs the main FC switch 3 to set the QoS value of the data transfer route (step S26) and sets the route between the migration source storage device 6 and the migration destination storage device 6 (step S27).

Then, the management device 10 instructs the migration source storage device 6 and the migration destination storage device 6 to start to copy data (step S28). Then, the management device 10 stops the VM 4a to be migrated and migrates the VM 4a (step S29), and activates the migrated VM 4a (step S30). Then, the management device 10 instructs the migration source storage device 6 and the migration destination storage device 6 to start to monitor the end of data copy (step S31).

In this way, because the management device 10 determines the QoS value of the migration destination physical volume 6b and the QoS value of the data transfer route, the information processing system 1 can reduce an effect on the process of the VM 4a not to be migrated.

Figure 18:
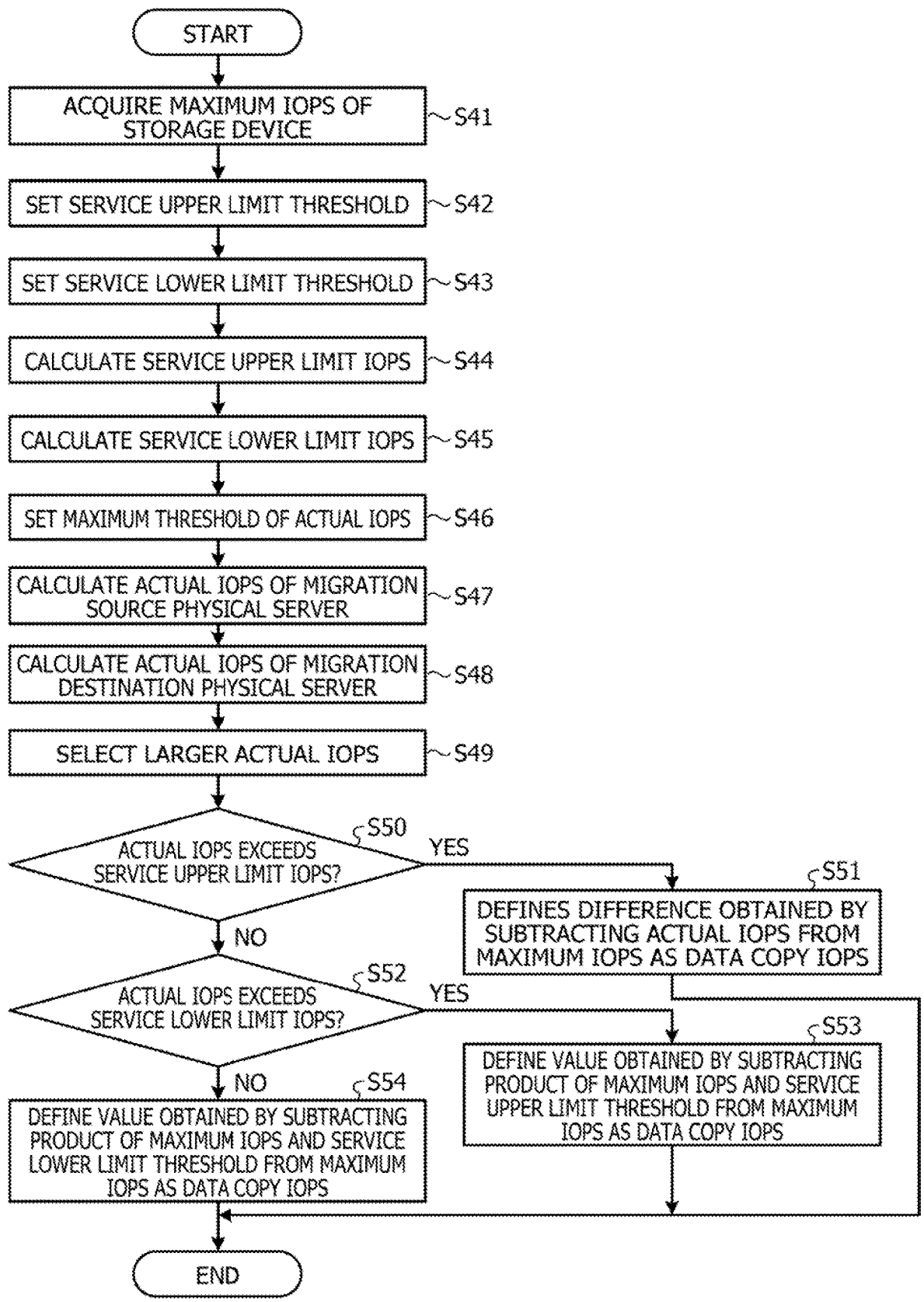
FIG. 18 is a flowchart illustrating a flow of a process for calculating the data copy IOPS.

FIG. 18 is a flowchart illustrating a flow of a process for calculating the data copy IOPS. As illustrated in FIG. 18, the adjustment unit 14 refers to the storage management table and acquires the maximum IOPS of the storage device 6 (step S41). Then, the adjustment unit 14 sets the service upper limit threshold and the service lower limit threshold (steps S42 and S43). Then, the adjustment unit 14 calculates the service upper limit IOPS and the service lower limit IOPS (steps S44 and S45). Then, the adjustment unit 14 sets the maximum threshold of the actual IOPS (step S46).

Then, the adjustment unit 14 refers to the throughput management table and calculates the actual IOPSs of the migration source physical server 4 and the migration destination physical server 4 (steps S47 and S48). Then, the adjustment unit 14 selects the larger actual IOPS from the calculated two actual IOPSs (step S49). Then, the adjustment unit 14 determines whether or not the actual IOPS exceeds the service upper limit IOPS (step S50). In a case where the actual IOPS exceeds the service upper limit IOPS, the adjustment unit 14 defines a difference obtained by subtracting the actual IOPS from the maximum IOPS as the data copy IOPS (step S51). However, in a case where the actual IOPS exceeds a product of the maximum threshold of the actual IOPS and the maximum IOPS, the adjustment unit 14 limits the actual IOPS to the product of the maximum threshold of the actual IOPS and the maximum IOPS.

In a case where the actual IOPS does not exceed the service upper limit IOPS, the adjustment unit 14 determines whether or not the actual IOPS exceeds the service lower limit IOPS (step S52). Then, in a case where the actual IOPS exceeds the service lower limit IOPS, the adjustment unit 14 defines a value obtained by subtracting a product of the maximum IOPS and the service upper limit threshold from the maximum IOPS as the data copy IOPS (step S53). In a case where the actual IOPS does not exceed the service lower limit IOPS, the adjustment unit 14 defines a value obtained by subtracting a product of the maximum IOPS and the service lower limit threshold from the maximum IOPS as the data copy IOPS (step S54).

In this way, the adjustment unit 14 determines the data copy IOPS on the basis of the larger IOPS of the actual IOPS of the migration source physical server 4 and the actual IOPS of the migration destination physical server 4. Therefore, the management device 10 can suppress a decrease in performance when another VM 4a that uses the copy destination storage device 6 and the other VM 4a that uses the copy source storage device 6 access the storage device 6.

Figure 19:
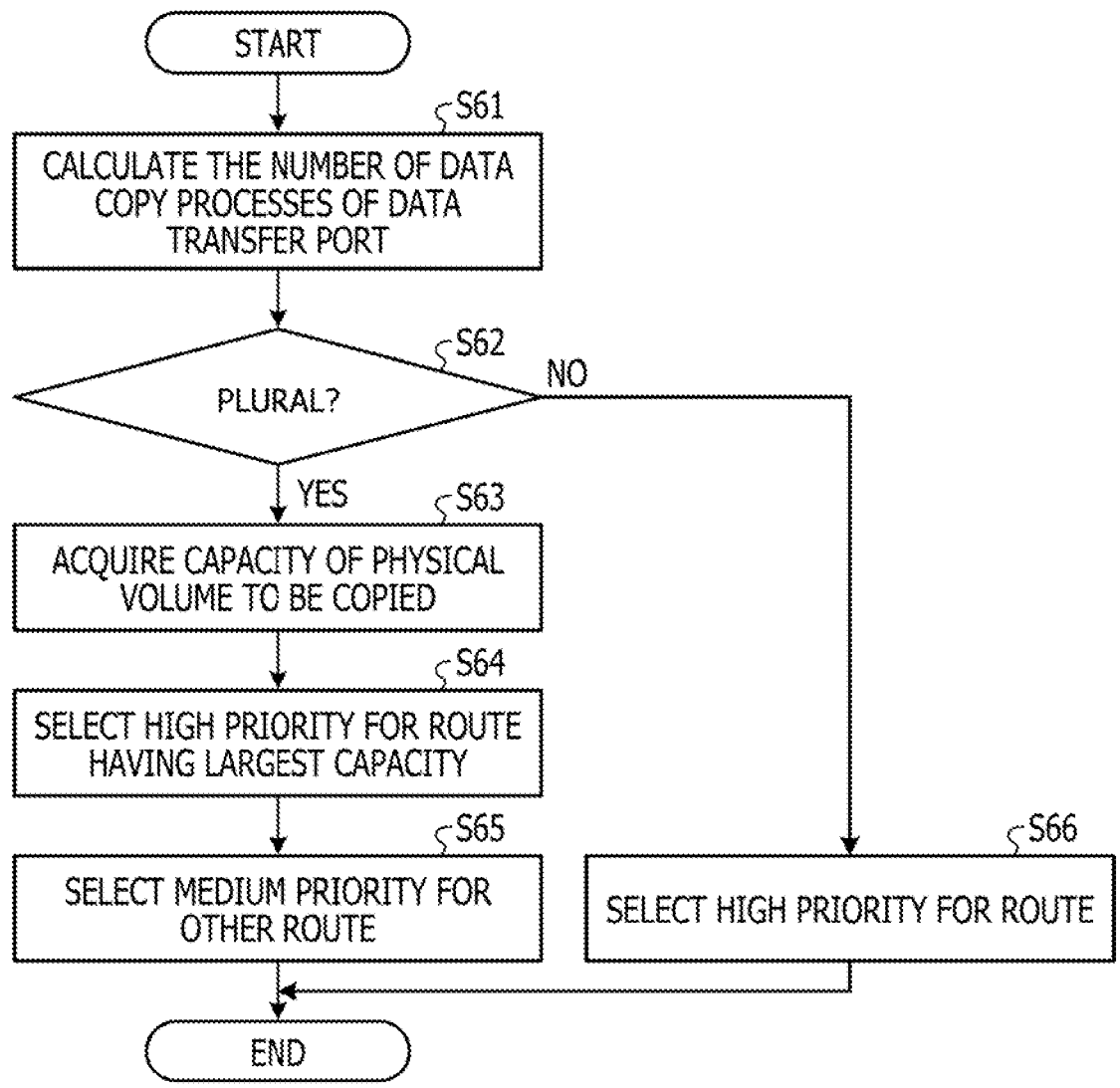
FIG. 19 is a flowchart illustrating a flow of a process for selecting a QoS value of a data transfer route.

FIG. 19 is a flowchart illustrating a flow of a process for selecting the QoS value of the data transfer route. As illustrated in FIG. 19, the adjustment unit 14 calculates the number of data copy processes of the data transfer port (step S61). The adjustment unit 14 calculates the number of data copy processes for both of a transfer source port and a transfer destination port. Then, the adjustment unit 14 determines whether or not the number of data copy processes of at least one of the transfer source port and the transfer destination port is plural (step S62).

Then, in a case where the number of data copy processes is plural, the adjustment unit 14 refers to the virtual server management table and acquires a capacity of the physical volume 6b to be copied (step S63). Then, the adjustment unit 14 selects a high priority for a route having the largest capacity among the acquired capacities (step S64) and selects a medium priority for the other route (step S65). On the other hand, in a case where the number of data copy processes is not plural, the adjustment unit 14 selects a high priority for the route (step S66).

In this way, in a case where the number of data copy processes of at least one of the transfer source port and the transfer destination port is plural, the adjustment unit 14 selects the high priority for the route having the largest capacity of the physical volume 6b to be copied and selects the medium priority for the other route. Therefore, the management device 10 can suppress an increase in a load of the port used for the plurality of data copies.

Figure 20:
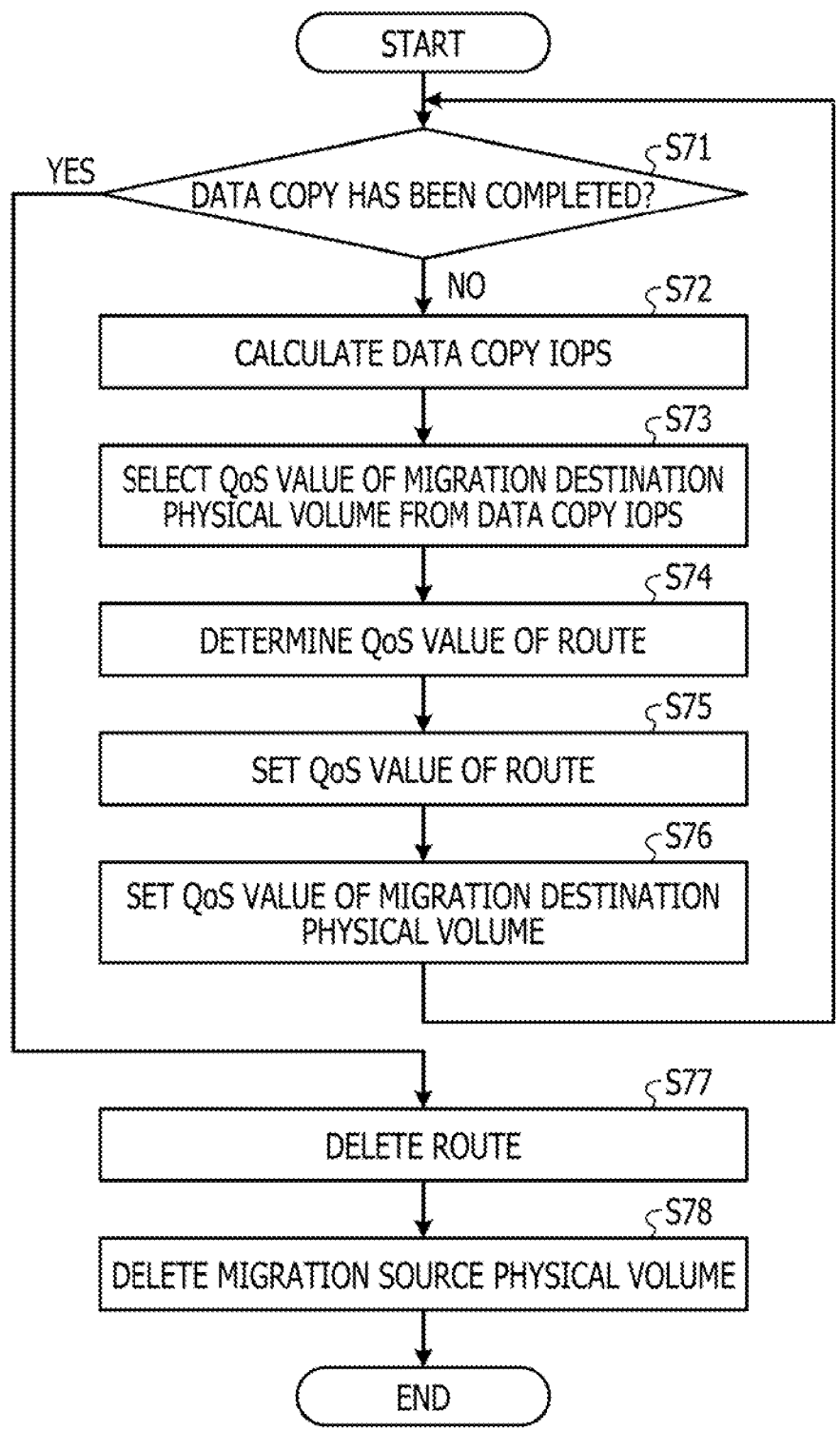
FIG. 20 is a flowchart illustrating a flow of a process after the VM migration.

FIG. 20 is a flowchart illustrating a flow of a process after the VM migration. As illustrated in FIG. 20, the management device 10 determines whether or not data copy has been completed (step S71). Then, in a case where data copy has not been completed, the management device 10 calculates the data copy IOPS (step S72), refers to the volume QoS management table, and selects the QoS value of the migration destination physical volume 6b from the data copy IOPS (step S73). Then, the management device 10 determines the QoS value of the data transfer route (step S74) and sets the QoS value of the route (step S75). Then, the management device 10 sets the QoS value of the migration destination physical volume 6b (step S76), and returns to step S71.

In a case where data copy has been completed, the management device 10 instructs the main FC switch 3 to delete the route (step S77) and instructs the migration source storage device 6 to delete the migration source physical volume 6b (step S78).

In this way, by changing the QoS value of the migration destination physical volume 6b and the QoS value of the route during data copy, the management device 10 can cope with the change in the access status to the migration source storage device 6 and the migration destination storage device 6.

Figure 21:
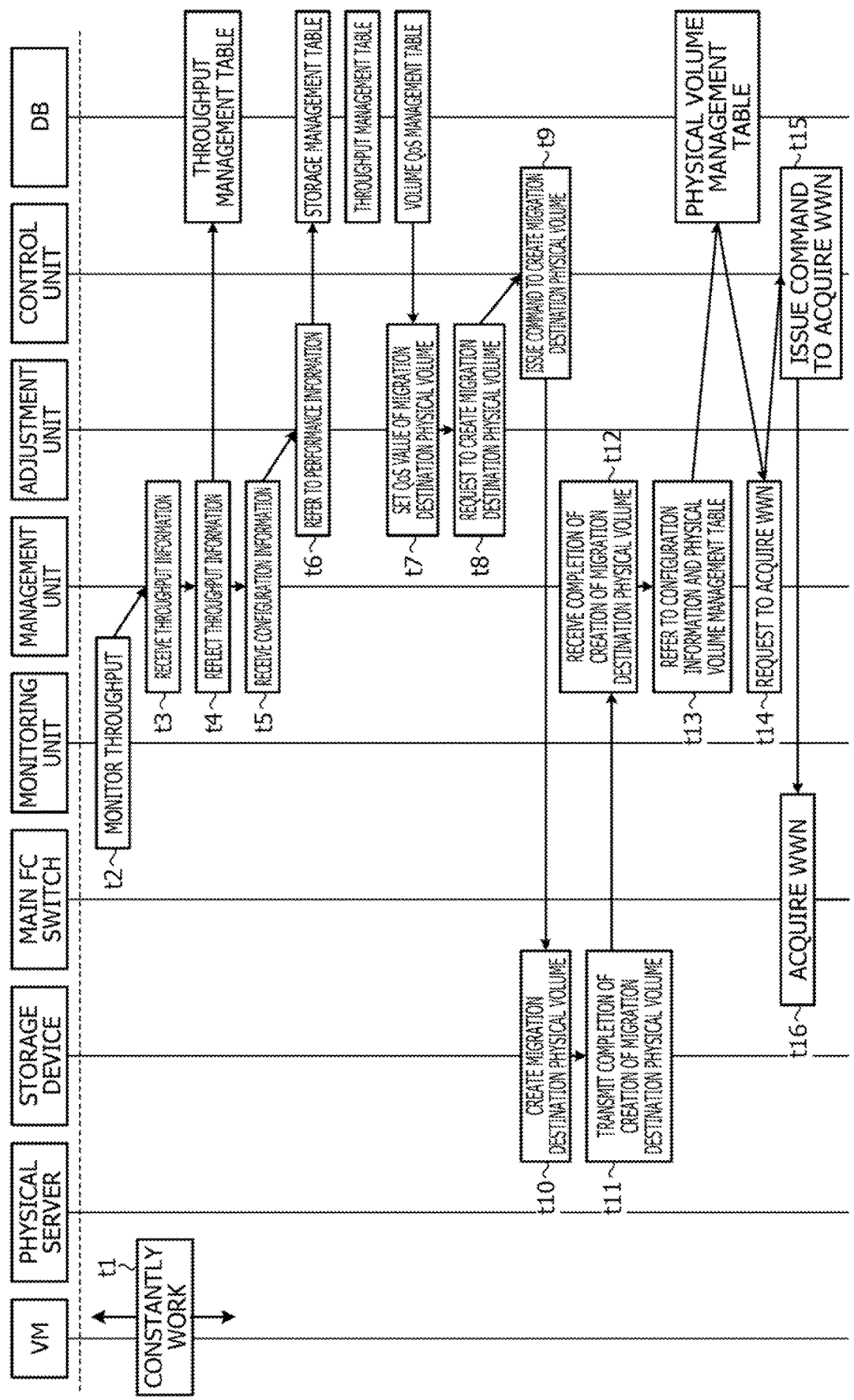
FIG. 21 is a first diagram illustrating a sequence of a process by the information processing system.

Next, a sequence of a process by the information processing system 1 will be described with reference to FIGS. 21 to 26. FIGS. 21 to 26 are diagrams illustrating the sequence of the process by the information processing system 1. As illustrated in FIG. 21, while the VM 4a constantly works (t), the monitoring unit 4b monitors the throughput of the storage device 6 in cooperation with the monitoring unit 6c (t2) and transmits the throughput information to the management unit 12.

The management unit 12 receives the throughput information (t3) and reflects the throughput information to the throughput management table (t4). The management unit 12 receives and reflects the throughput information at the first time interval. Then, the management unit 12 receives the configuration information (t5). When the VM 4a is migrated, the adjustment unit 14 refers to performance information (t6). Here, the performance information is information registered in the storage management table, the throughput management table, and the volume QoS management table.

Then, the adjustment unit 14 determines the QoS value of the migration destination physical volume 6b on the basis of the performance information and sets the QoS value of the migration destination physical volume 6b (t7). For example, the adjustment unit 14 requests the control unit 13 to create the migration destination physical volume 6b having the determined QoS value (t8), and the control unit 13 issues a command to create the migration destination physical volume 6b having the QoS value determined by the adjustment unit 14 to the migration destination storage device 6 (t9).

The migration destination storage device 6 creates the migration destination physical volume 6b (t10) and transmits completion of creation of the migration destination physical volume 6b to the management unit 12 (t11).

When receiving the completion of creation of the migration destination physical volume 6b (t12), the management unit 12 refers to the configuration information and the physical volume management table (t13), and requests the control unit 13 to acquire the WWN (t14). The control unit 13 issues a command to acquire the WWN to the main FC switch 3 (t15), and the main FC switch 3 acquires the WWN (t16).

Figure 22:
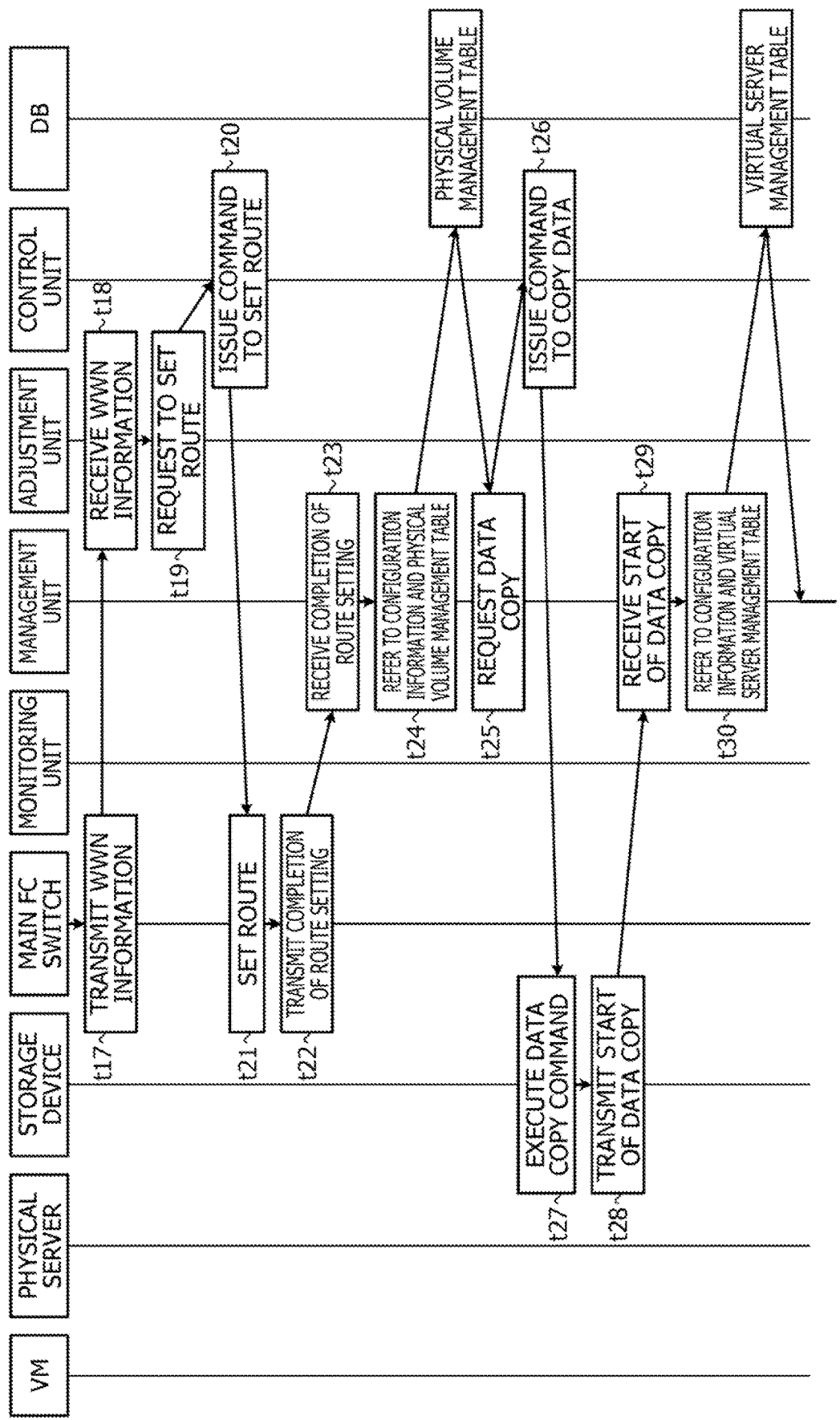
FIG. 22 is a second diagram illustrating the sequence of the process by the information processing system.

Then, as illustrated in FIG. 22, the main FC switch 3 transmits the acquired WWN information to the adjustment unit 14 (t17). When receiving the WWN information (t18), the adjustment unit 14 determines the QoS value of the data transfer route and requests the control unit 13 to set the route with the determined QoS value (t19). The control unit 13 issues a command to set the route to the main FC switch 3 (t20), and the main FC switch 3 sets the route (t21) and transmits completion of route setting to the management unit 12 (t22).

When receiving the completion of route setting (t23), the management unit 12 refers to the configuration information and the physical volume management table (t24) and requests the control unit 13 to copy data (t25). The control unit 13 issues a data copy command to the migration source storage device 6 and the migration destination storage device 6 (t26). The migration source storage device 6 and the migration destination storage device 6 execute the data copy command in cooperation (t27) and transmit start of data copy to the management unit 12 (t28).

Figure 23:
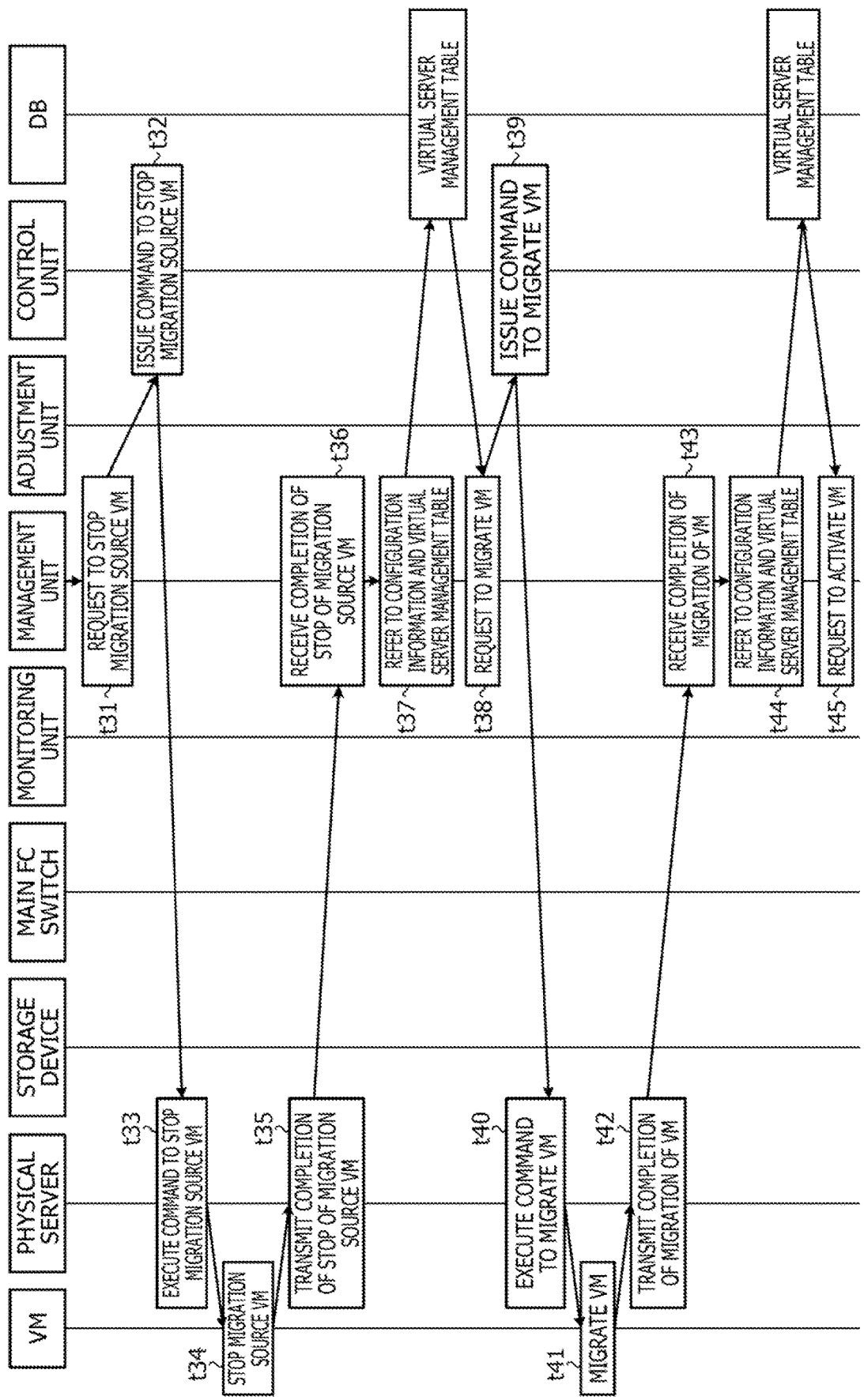
FIG. 23 is a third diagram illustrating the sequence of the process by the information processing system.

When receiving the start of data copy (t29), the management unit 12 refers to the configuration information and the virtual server management table (t30) and requests the control unit 13 to stop the migration source VM 4a as Illustrated in FIG. 23 (t31). The control unit 13 issues a command to stop the migration source VM 4a to the migration source physical server 4 (t32), and the migration source physical server 4 executes the command to stop the migration source VM 4a (t33). Then, the migration source VM 4a stops (t34), and the migration source physical server 4 transmits completion of stop of the migration source VM 4a to the management unit 12 (t35).

When receiving the completion of stop of the migration source VM 4a (t36), the management unit 12 refers to the configuration information and the virtual server management table (t37) and requests the control unit 13 to migrate the VM 4a (t38). The control unit 13 issues a command to migrate the VM 4a to the migration source physical server 4 and the migration destination physical server 4 (t39), and the migration source physical server 4 and the migration destination physical server 4 execute the command to migrate the VM 4a (t40). Then, the VM 4a is migrated (t41), and the migration source physical server 4 and the migration destination physical server 4 transmit completion of migration of the VM 4a to the management unit 12 (t42).

Figure 24:
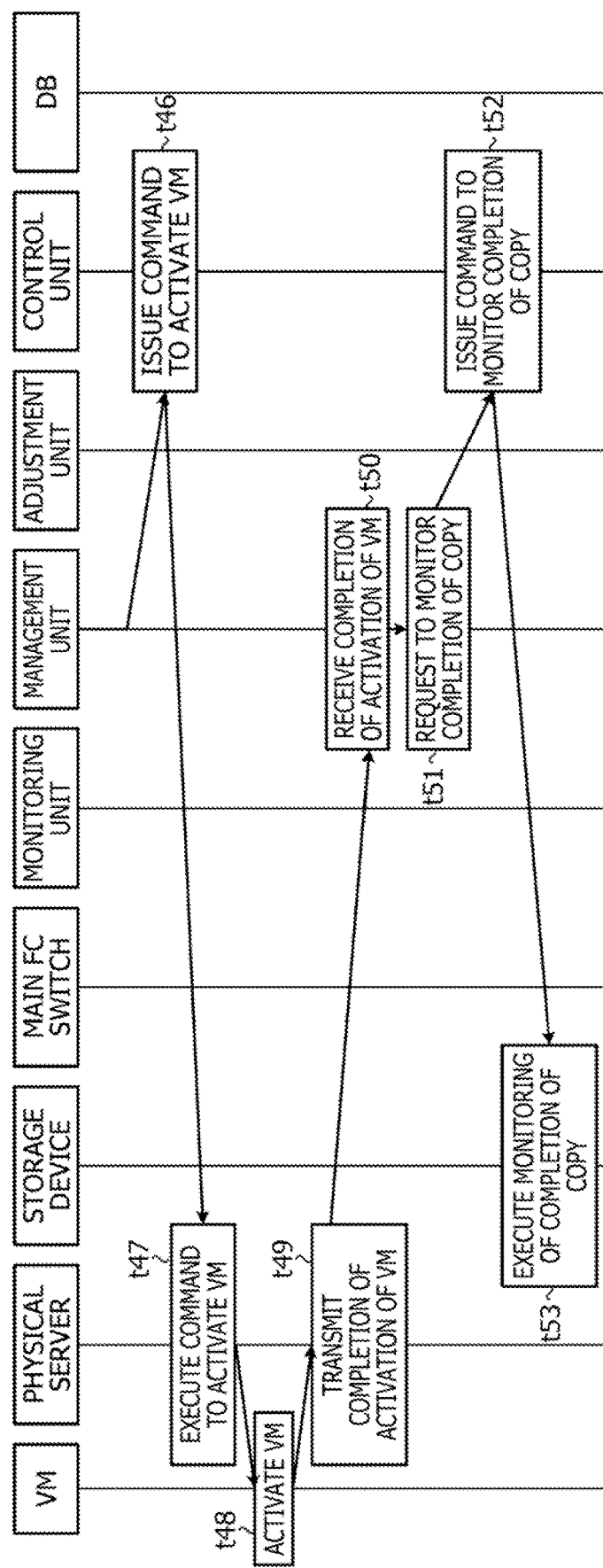
FIG. 24 is a fourth diagram illustrating the sequence of the process by the information processing system.

When receiving the completion of migration of the VM 4a (t43), the management unit 12 refers to the configuration information and the virtual server management table (t44) and requests the control unit 13 to activate the VM 4a (t45). As illustrated in FIG. 24, the control unit 13 issues a command to activate the VM 4a to the migration destination physical server 4 (t46), and the migration destination physical server 4 executes the command to activate the VM 4a (t47). Then, the VM 4a is activated (t48), and the migration destination physical server 4 transmits completion of activation of the VM 4a to the management unit 12 (t49).

When receiving the completion of activation of the VM 4a (t50), the management unit 12 requests the control unit 13 to monitor completion of copy (t51). The control unit 13 issues a command to monitor the completion of copy to the migration destination storage device 6 (t52), and the migration destination storage device 6 monitors the completion of copy (t53).

In this way, the information processing system 1 sets the QoS value of the migration destination physical volume 6b and the QoS value of the route on the basis of the loads of the migration source storage device 6 and the migration destination storage device 6. Therefore, the information processing system 1 can suppress the decrease in the performance when the other VM 4a accesses the migration source storage device 6 or the migration destination storage device 6 during data copy.

Figure 25:
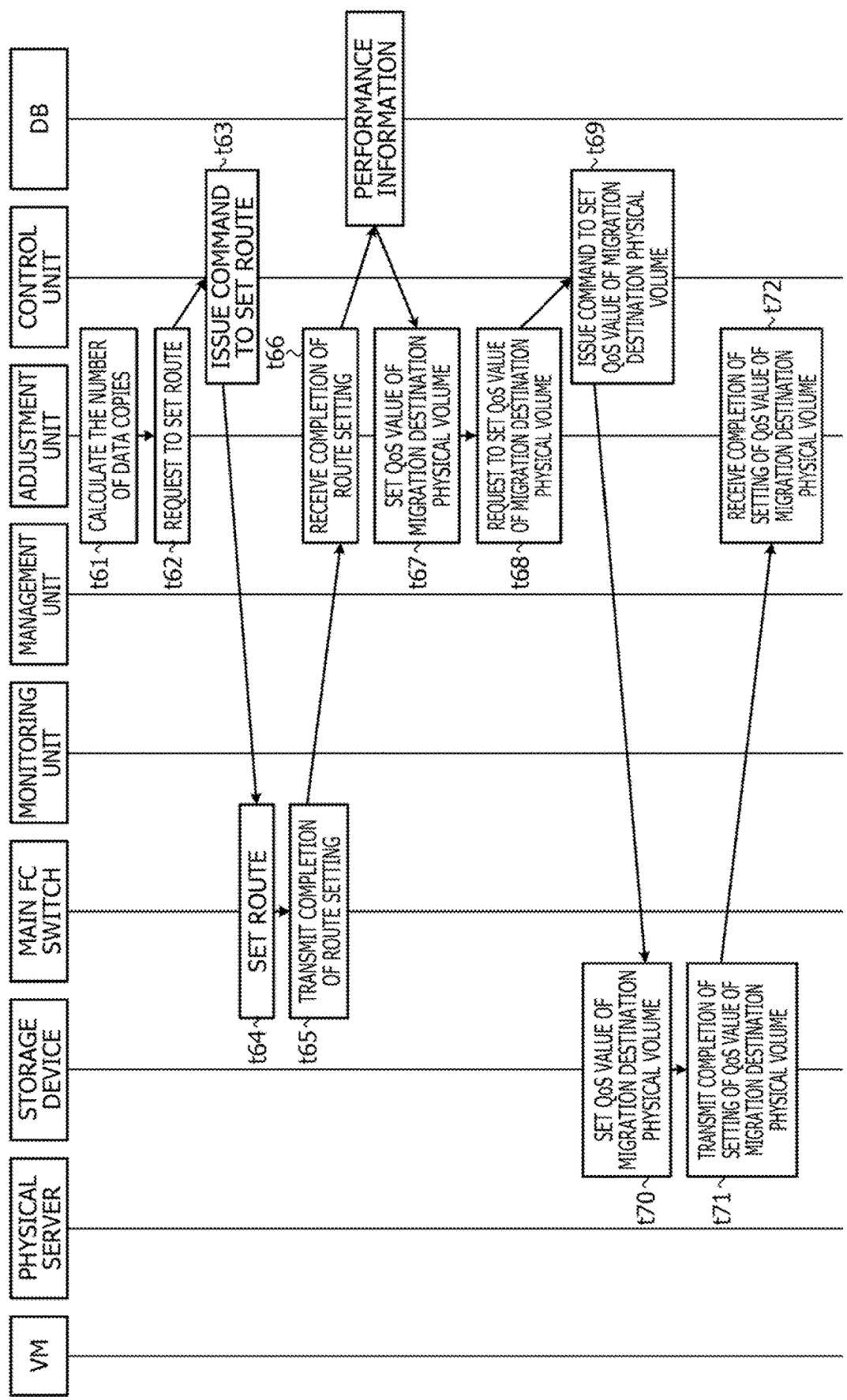
FIG. 25 is a fifth diagram illustrating the sequence of the process by the information processing system.

Furthermore, the information processing system 1 resets the QoS value of the route and the QoS value of the migration destination physical volume 6b at the second time interval during data copy as illustrated in FIG. 25. For example, the adjustment unit 14 calculates the number of data copies of the data transfer source and data transfer destination ports (t61), determines the QoS value of the data transfer route, and requests the control unit 13 to set the route with the determined QoS value (t62). The control unit 13 issues a command to set the route to the main FC switch 3 (t63), and the main FC switch 3 sets the route (t64) and transmits completion of route setting to the adjustment unit 14 (t65).

When receiving the completion of route setting (t66), the adjustment unit 14 refers to the performance information, calculates the QoS value of the migration destination physical volume 6b on the basis of the performance information, and sets the QoS value of the migration destination physical volume 6b (t67). For example, the adjustment unit 14 requests the control unit 13 to set the migration destination physical volume 6b with the calculated QoS value (t68), and the control unit 13 issues a command to set the migration destination physical volume 6b to the migration destination storage device 6 (t69). The migration destination storage device 6 sets the QoS value of the migration destination physical volume 6b (t70) and transmits completion of setting of the QoS value of the migration destination physical volume 6b to the adjustment unit 14 (t71). The adjustment unit 14 receives the completion of setting of the QoS value of the migration destination physical volume 6b (t72).

In this way, because the information processing system 1 resets the QoS value of the route and the QoS value of the migration destination physical volume 6b at the second time interval during data copy, the information processing system 1 can cope with a fluctuation in the loads of the migration source storage device 6 and the migration destination storage device 6.

Figure 26:
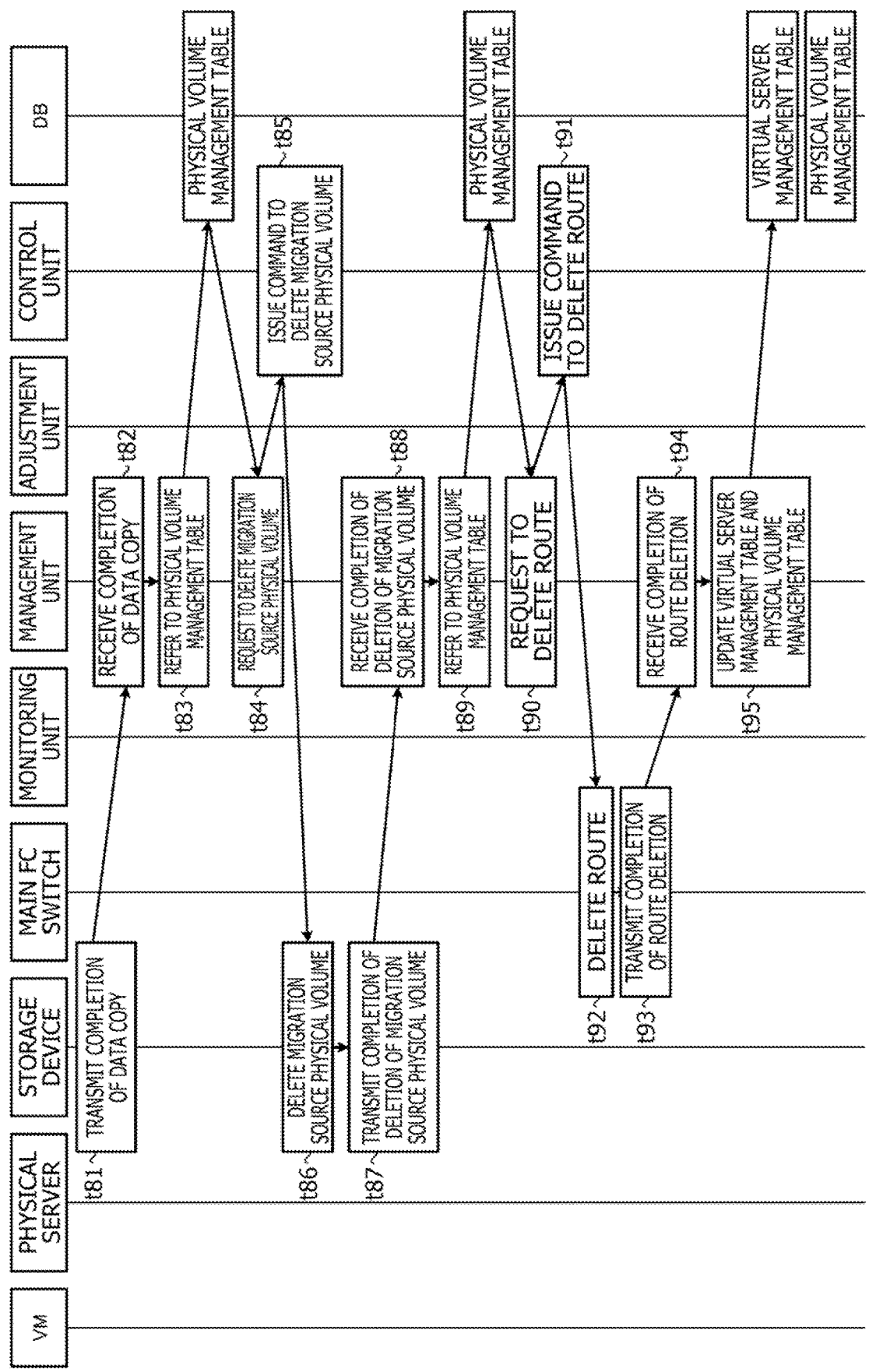
FIG. 26 is a sixth diagram illustrating the sequence of the process by the information processing system.

When data copy is completed, as illustrated in FIG. 26, the migration destination storage device 6 transmits completion of data copy to the management unit 12 (t81). When receiving the completion of data copy (t82), the management unit 12 refers to the physical volume management table (t83) and requests the control unit 13 to delete the migration source physical volume 6b (t84). The control unit 13 issues a command to delete the migration source physical volume 6b to the migration source storage device 6 (t85).

The migration source storage device 6 deletes the migration source physical volume 6b (t86) and transmits completion of deletion of the migration source physical volume 6b to the management unit 12 (t87). When receiving the completion of deletion of the migration source physical volume 6b (t88), the management unit 12 refers to the physical volume management table (t89) and requests the control unit 13 to delete the route (t90). The control unit 13 issues a command to delete the route to the main FC switch 3 (t91).

The main FC switch 3 deletes the route (192) and transmits the completion of route deletion to the management unit 12 (193). When receiving the completion of route deletion (194), the management unit 12 updates the virtual server management table and the physical volume management table on the basis of the configuration information (195).

In this way, when data copy is completed, the information processing system 1 deletes the migration source physical volume 6b and the route. Therefore, it is possible to release unnecessary physical resources.

As described above, in the embodiment, the monitoring unit 4b of the physical server 4 creates the throughput information of the physical volume 6b at the first time interval in cooperation with the monitoring unit 6c of the storage device 6 and transmits the throughput information to the management device 10. The management unit 12 of the management device 10 registers the received throughput information in the throughput management table. Then, the adjustment unit 14 determines the QoS value of the migration destination physical volume 6b on the basis of the throughput information of the migration source storage device 6 and the migration destination storage device 6. Then, the control unit 13 generates a command to create the migration destination physical volume 6b on the basis of the QoS value determined by the adjustment unit 14 and issues the command to the migration destination storage device 6. Therefore, the information processing system 1 can suppress the decrease in the performance when the VM 4a that is not a migration target accesses the migration source storage device 6 or the migration destination storage device 6 during data copy.

Furthermore, in the embodiment, the adjustment unit 14 determines the QoS value of the data transfer route on the basis of the number of data copy processes of the transfer source port and the transfer destination port that are respectively used by the migration source storage device 6 and the migration destination storage device 6 for data transfer. Then, the control unit 13 generates a command to set the data transfer route on the basis of the QoS value determined by the adjustment unit 14 and issues the command to the main FC switch 3. Therefore, the information processing system 1 can suppress an increase in the load of the port used for data transfer.

Furthermore, in the embodiment, the adjustment unit 14 calculates the data copy IOPS on the basis of the larger actual IOPS of the actual IOPS of the migration source storage device 6 and the actual IOPS of the migration destination storage device 6, the service upper limit threshold, and the service lower limit threshold. Then, the adjustment unit 14 determines the QoS value of the migration destination physical volume 6b on the basis of the calculated data copy IOPS. Therefore, the adjustment unit 14 can appropriately determine the QoS value of the migration destination physical volume 6b.

Note that, in the embodiment, the management device 10 has been described. However, by implementing the configuration of the management device 10 by software, it is possible to obtain a management program that has a similar function. Therefore, a computer that executes the management program will be described.

Figure 27:
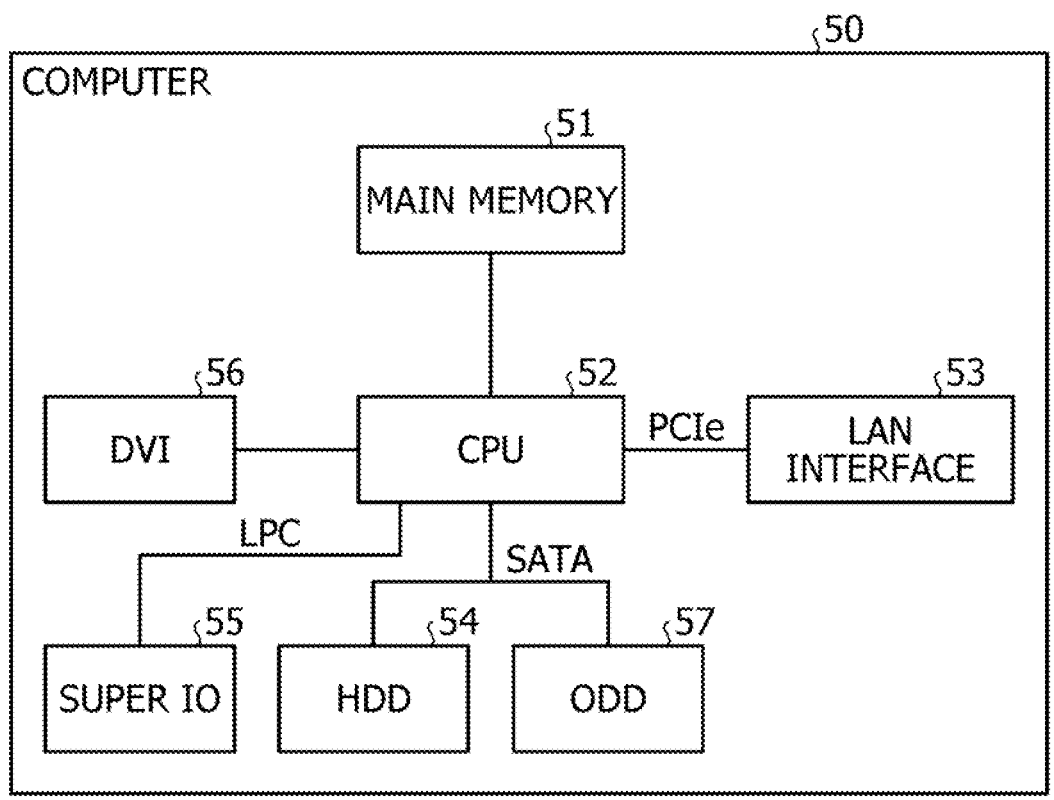
FIG. 27 is a diagram illustrating a hardware configuration of a computer that executes a management program according to an embodiment.
Figure 28A:
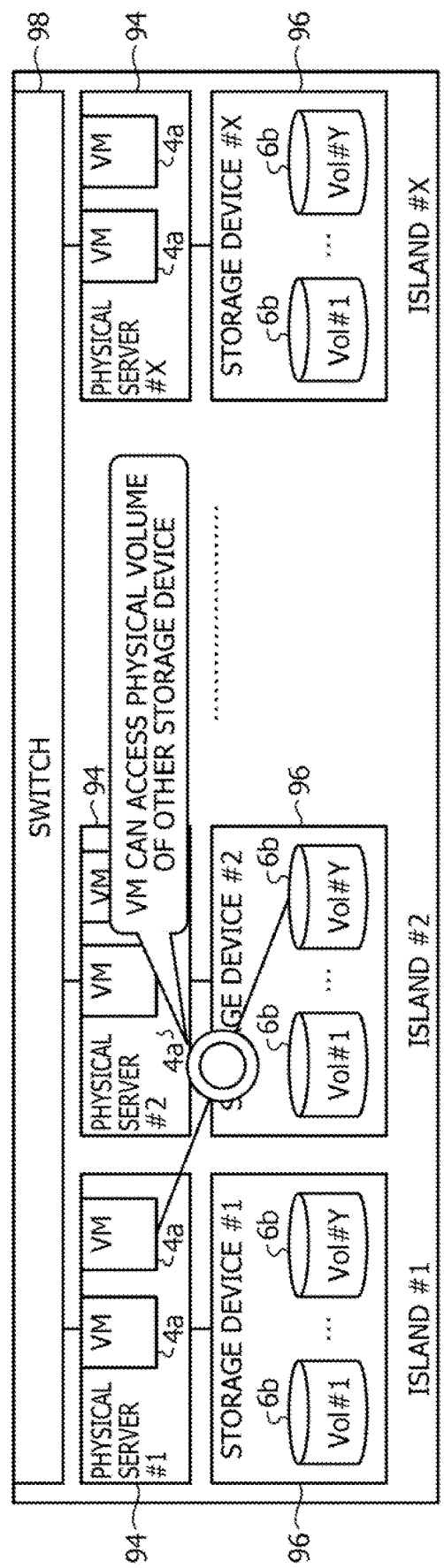
FIGS. 28A and 28B are diagrams for explaining a difference between a general cloud platform and a target cloud platform.
Figure 28B:
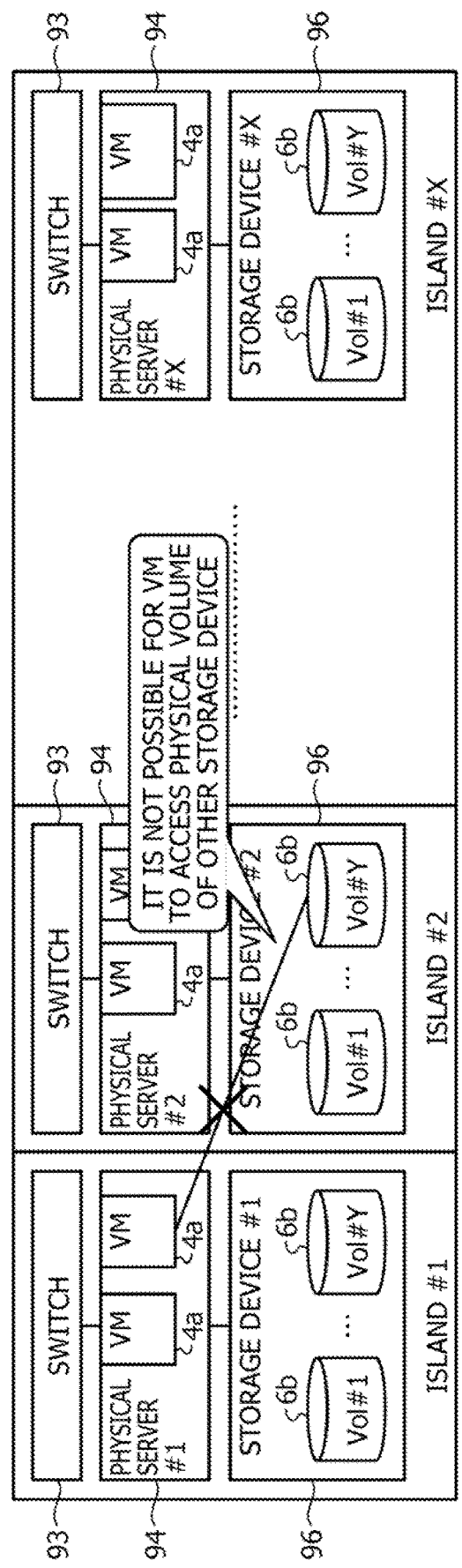

FIG. 27 is a diagram illustrating a hardware configuration of a computer that executes a management program according to the embodiment. As illustrated in FIG. 27, a computer 50 includes a main memory 51, a CPU 52 which is an example of a processor, a Local Area Network (LAN) interface 53, and a Hard Disk Drive (HDD) 54. Furthermore, the computer 50 includes a super Input Output (IO) 55, a Digital Visual Interface (DVI) 56, and an Optical Disk Drive (ODD) 57.

The main memory 51 is a memory that stores a program, a halfway result of execution of the program, and the like. The CPU 52 is a central processing unit that reads and executes the program from the main memory 51. The CPU 52 includes a chipset having a memory controller.

The LAN interface 53 is an interface for connecting the computer 50 to another computer via a LAN. The HDD 54 is a disk device that stores programs and data, and the super IO 55 is an interface for connecting an input device such as a mouse and a keyboard. The DVI 56 is an Interface for connecting a liquid crystal display device, and the ODD 57 is a device for reading and writing a DVD or compact disc recordable (CD-R).

The LAN interface 53 is connected to the CPU 52 by PCI Express (PCIe), and the HDD 54 and the ODD 57 are connected to the CPU 52 by Serial Advanced Technology Attachment (SATA). The super IO 55 is connected to the CPU 52 by Low Pin Count (LPC).

Then, the management program executed by the computer 50 is stored in a CD-R that is an example of a recording medium that can be read by the computer 50 and is read from the CD-R by the ODD 57 and installed to the computer 50. Alternatively, the management program is stored in a database or the like of another computer system connected via the LAN interface 53 and is read from these databases and is installed to the computer 50. Then, the installed management program is stored in the HDD 54, is read to the main memory 51, and is executed by the CPU 52.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A management device of controlling an information processing system of performing a migration of a virtual server from a migration source physical server to a migration destination physical server, the management device comprising:
a memory; and
a processor coupled to the memory, the processor being configured to perform processing, the processing including:
determining, based on a first throughput and a second throughput, a first Quality of Service (QoS) value of a migration destination volume of a migration destination storage device to be used for the migration of the virtual server, the first throughput being a throughput regarding an access to a migration source storage device of the migration source physical server, the second throughput being a throughput regarding an access to the migration destination storage device of the migration destination physical server;

in response to the determining of the first QoS value, generating a first command by using the determined first QoS value, to issue the generated first command to the migration destination storage device, the first command being a command to cause the migration destination storage device to create, based on the first QoS value, a volume to be used as the migration destination volume in the migration of the virtual server; and in response to the issuing of the generated first command, causing the information processing system to perform replication processing including replicating data used by the virtual server from a migration source volume of the migration source storage device to the migration destination volume of the migration destination storage device, the determining of the first QoS value of the migration destination volume is configured to:

in a case where a Input Output Per Second (IOPS) of a larger storage device that has a larger IOPS of a first IOPS of the migration source storage device or a second IOPS of the migration destination storage device exceeds an upper limit threshold and does not exceed a maximum threshold of an IOPS, determine the first QoS value of the migration destination volume by using a difference between a maximum IOPS corresponding to the larger storage device and the IOPS of the larger storage device;

determine the first QoS value of the migration destination volume by using a difference between the maximum IOPS and the maximum threshold in a case where the IOPS of the larger storage device exceeds the upper limit threshold and exceeds the maximum threshold;

determine the first QoS value of the migration destination volume by using a difference between the maximum IOPS and a lower limit threshold in a case where the IOPS of the larger storage device does not exceed the lower limit threshold; and determine the first QoS value of the migration destination volume by using a difference between the maximum IOPS and the upper limit threshold in a case where the IOPS of the larger storage device exceeds the lower limit threshold and does not exceed the upper limit threshold.

2. The management device according to claim 1, wherein the processing further includes:

determining, based on a number of replication processes, a second QoS value of a route used when the data is transferred from the migration source storage device to the migration destination storage device, the replication processes being processes with respect to a transfer source port and a transfer destination port respectively used to transfer the data by the migration source storage device and the migration destination storage device; and generating a second command, to issue the generated second command to a relay device configured to relay the data transfer, the second command being a command to set the route on the basis of the transfer source port and the transfer destination port and the second QoS value determined for the route.

3. The management device according to claim 2, wherein the determining of the first QoS value of the migration destination volume and the determining of the second QoS value of the route are performed at a predetermined time interval during the replication processing, and the processing further includes:

generating a third command, to issue the generated third command to the migration destination storage device, the third command being a command to set the first QoS value of the migration destination volume by using the determined first QoS value of the migration destination volume; and generating a fourth command, to issue the generated fourth command to the relay device, the fourth command being a command to set the second QoS value of the route by using the determined second QoS value of the route.

4. An information processing system comprising:
a plurality of physical servers;
a plurality of storage devices managed by the plurality of physical servers; and
a management device of controlling the information processing system of performing a migration of a virtual server from a migration source physical server to a migration destination physical server among the plurality of physical servers, the management device including a processor configured to perform processing, the processing including:

determining, based on a first throughput and a second throughput, a Quality of Service (QoS) value of a migration destination volume of a migration destination storage device to be used for the migration of the virtual server, the first throughput being a throughput regarding an access to a migration source storage device of the migration source physical server, the second throughput being a throughput regarding an access to the migration destination storage device of the migration destination physical server;

in response to the determining of the QoS value, generating a first command by using the determined QoS value, to issue the generated first command to the migration destination storage device, the first command being a command to cause the migration destination storage device to create, based on the QoS value, a volume to be used as the migration destination volume in the migration of the virtual server; and in response to the issuing of the generated first command, causing the information processing system to perform replication processing including replicating data used by the virtual server from a migration source volume of the migration source storage device to the migration destination volume of the migration destination storage device, the determining of the first QoS value of the migration destination volume is configured to:

in a case where a Input Output Per Second (IOPS) of a larger storage device that has a larger IOPS of a first IOPS of the migration source storage device or a second IOPS of the migration destination storage device exceeds an upper limit threshold and does not exceed a maximum threshold of an IOPS, determine the first QoS value of the migration destination volume by using a difference between a maximum IOPS corresponding to the larger storage device and the IOPS of the larger storage device;

determine the first QoS value of the migration destination volume by using a difference between the maximum IOPS and the maximum threshold in a case where the IOPS of the larger storage device exceeds the upper limit threshold and exceeds the maximum threshold;

determine the first QoS value of the migration destination volume by using a difference between the maximum IOPS and a lower limit threshold in a case where the IOPS of the larger storage device does not exceed the lower limit threshold; and determine the first QoS value of the migration destination volume by using a difference between the maximum IOPS and the upper limit threshold in a case where the IOPS of the larger storage device exceeds the lower limit threshold and does not exceed the upper limit threshold.

5. The information processing system according to claim 4, wherein the processing further includes:

determining, based on a number of replication processes, a second QoS value of a route used when the data is transferred from the migration source storage device to the migration destination storage device, the replication processes being processes with respect to a transfer source port and a transfer destination port respectively used to transfer the data by the migration source storage device and the migration destination storage device; and generating a second command, to issue the generated second command to a relay device configured to relay the data transfer, the second command being a command to set the route on the basis of the transfer source port and the transfer destination port and the second QoS value determined for the route.

6. The information processing system according to claim 5, wherein the determining of the first QoS value of the migration destination volume and the determining of the second QoS value of the route are performed at a predetermined time interval during the replication processing, and the processing further includes:

generating a third command, to issue the generated third command to the migration destination storage device, the third command being a command to set the first QoS value of the migration destination volume by using the determined first QoS value of the migration destination volume; and generating a fourth command, to issue the generated fourth command to the relay device, the fourth command being a command to set the second QoS value of the route by using the determined second QoS value of the route.

7. A non-transitory computer-readable storage medium for storing a management program which causes a processor of a management device of controlling an information processing system of performing a migration of a virtual server from a migration source physical server to a migration destination physical server to perform processing, the processing comprising:

determining, based on a first throughput and a second throughput, a Quality of Service (QoS) value of a migration destination volume of a migration destination storage device to be used for the migration of the virtual server, the first throughput being a throughput regarding an access to a migration source storage device of the migration source physical server, the second throughput being a throughput regarding an access to the migration destination storage device of the migration destination physical server;

in response to the determining of the QoS value, generating a first command by using the determined QoS value, to issue the generated first command to the migration destination storage device, the first command being a command to cause the migration destination storage device to create, based on the QoS value, a volume to be used as the migration destination volume in the migration of the virtual server; and in response to the issuing of the generated first command, causing the information processing system to perform replication processing including replicating data used by the virtual server from a migration source volume of the migration source storage device to the migration destination volume of the migration destination storage device, the determining of the first QoS value of the migration destination volume is configured to:

in a case where a Input Output Per Second (IOPS) of a larger storage device that has a larger IOPS of a first IOPS of the migration source storage device or a second IOPS of the migration destination storage device exceeds an upper limit threshold and does not exceed a maximum threshold of an IOPS, determine the first QoS value of the migration destination volume by using a difference between a maximum IOPS corresponding to the larger storage device and the IOPS of the larger storage device;

determine the first QoS value of the migration destination volume by using a difference between the maximum IOPS and the maximum threshold in a case where the IOPS of the larger storage device exceeds the upper limit threshold and exceeds the maximum threshold;

determine the first QoS value of the migration destination volume by using a difference between the maximum IOPS and a lower limit threshold in a case where the IOPS of the larger storage device does not exceed the lower limit threshold; and determine the first QoS value of the migration destination volume by using a difference between the maximum IOPS and the upper limit threshold in a case where the IOPS of the larger storage device exceeds the lower limit threshold and does not exceed the upper limit threshold.

8. The non-transitory computer-readable storage medium according to claim 7, wherein the processing further includes:

determining, based on a number of replication processes, a second QoS value of a route used when the data is transferred from the migration source storage device to the migration destination storage device, the replication processes being processes with respect to a transfer source port and a transfer destination port respectively used to transfer the data by the migration source storage device and the migration destination storage device; and generating a second command, to issue the generated second command to a relay device configured to relay the data transfer, the second command being a command to set the route on the basis of the transfer source port and the transfer destination port and the second QoS value determined for the route.

9. The non-transitory computer-readable storage medium according to claim 8, wherein the determining of the first QoS value of the migration destination volume and the determining of the second QoS value of the route are performed at a predetermined time interval during the replication processing, and the processing further includes:

generating a third command, to issue the generated third command to the migration destination storage device, the third command being a command to set the first QoS value of the migration destination volume by using the determined first QoS value of the migration destination volume; and generating a fourth command, to issue the generated fourth command to the relay device, the fourth command being a command to set the second QoS value of the route by using the determined second QoS value of the route.

\* \* \* \* \*